United States Patent
Rastogi

(10) Patent No.: US 10,778,707 B1
(45) Date of Patent: Sep. 15, 2020

(54) OUTLIER DETECTION FOR STREAMING DATA USING LOCALITY SENSITIVE HASHING

(71) Applicant: Amazon Technologies, Inc., Seattle, WA (US)

(72) Inventor: Rajeev Ramnarain Rastogi, Bangalore (IN)

(73) Assignee: Amazon Technologies, Inc., Seattle, WA (US)

(*) Notice: Subject to any disclaimer, the term of this patent is extended or adjusted under 35 U.S.C. 154(b) by 434 days.

(21) Appl. No.: 15/153,712

(22) Filed: May 12, 2016

(51) Int. Cl.
*H04L 29/06* (2006.01)
*G06F 16/22* (2019.01)
*G06F 16/901* (2019.01)
*G06F 16/2455* (2019.01)

(52) U.S. Cl.
CPC .......... *H04L 63/1425* (2013.01); *G06F 16/22* (2019.01); *G06F 16/24568* (2019.01); *G06F 16/9014* (2019.01); *H04L 63/1441* (2013.01)

(58) Field of Classification Search
CPC ...... G06F 21/62; G06F 21/6227; G06F 21/82; G06F 17/30; G06F 17/30312; G06F 17/30516; G06F 17/30949; H04L 63/12; H04L 63/14; H04L 63/1416; H04L 63/1425; H04L 63/302; H04L 63/1441; H04L 9/32
USPC .......................................................... 726/23
See application file for complete search history.

(56) References Cited

U.S. PATENT DOCUMENTS

| | | | |
|---|---|---|---|
| 4,821,333 A | 4/1989 | Gillies | |
| 6,226,629 B1 * | 5/2001 | Cossock | G06F 16/9014 |
| 6,487,552 B1 | 11/2002 | Lei et al. | |
| 6,889,218 B1 | 5/2005 | Nassehi | |
| 7,050,932 B2 * | 5/2006 | Selby | G06Q 40/02 702/179 |
| 7,296,018 B2 | 11/2007 | Abe et al. | |

(Continued)

FOREIGN PATENT DOCUMENTS

| | | |
|---|---|---|
| CN | 102360378 | 2/2012 |
| CN | 103530812 | 1/2014 |

(Continued)

OTHER PUBLICATIONS

Nisarg Raval et al., Privacy Preserving Outlier Detection using Locality Sensitive Hashing, 2011, 2011 11th IEEE International Conference on Data Mining Workshops (Year: 2011).*

(Continued)

*Primary Examiner* — Kambiz Zand
*Assistant Examiner* — Mahabub S Ahmed
(74) *Attorney, Agent, or Firm* — Robert C. Kowert; Kowert, Hood, Munyon, Rankin & Goetzel, P.C.

(57) ABSTRACT

A matching record set with respect to a particular data record of a stream is identified based on output values produced by a particular band of locality sensitive hash functions. Using respective matching record sets corresponding to the particular data record and one or more other bands of locality sensitive hash functions, an estimate of a count of data records of the stream which meet a particular inter-record distance criterion is obtained. A determination as to whether the particular data record is to be designated as an outlier with respect to previously-observed records of the data stream is made using the estimated count.

23 Claims, 13 Drawing Sheets

(56) References Cited

U.S. PATENT DOCUMENTS

| | | | |
|---|---|---|---|
| 7,346,923 B2 | 3/2008 | Atkins et al. | |
| 7,685,194 B2 | 3/2010 | Kabra et al. | |
| 7,743,003 B1 | 6/2010 | Tong et al. | |
| 8,078,556 B2 | 12/2011 | Adi et al. | |
| 8,140,505 B1* | 3/2012 | Jain | G06F 16/9014 707/706 |
| 8,229,864 B1 | 7/2012 | Lin et al. | |
| 8,261,330 B2 | 9/2012 | Atkins et al. | |
| 8,363,961 B1* | 1/2013 | Avidan | G06K 9/6218 382/224 |
| 8,370,280 B1 | 2/2013 | Lin et al. | |
| 8,429,103 B1 | 4/2013 | Aradhye et al. | |
| 8,447,032 B1* | 5/2013 | Covell | G06F 16/9014 380/28 |
| 8,510,311 B2* | 8/2013 | Shibata | G06K 9/00288 707/747 |
| 8,527,516 B1* | 9/2013 | Spasojevic | G06F 16/954 707/738 |
| 8,606,730 B1 | 12/2013 | Tong et al. | |
| 8,682,814 B2 | 3/2014 | DiCorpo et al. | |
| 8,925,087 B1 | 12/2014 | Oliver et al. | |
| 9,386,037 B1* | 7/2016 | Hunt | H04L 63/20 |
| 9,516,089 B1* | 12/2016 | Ansel | H04L 67/02 |
| 9,628,805 B2* | 4/2017 | Smarda | G06F 16/583 |
| 9,747,297 B2* | 8/2017 | Penangwala | G06F 16/137 |
| 2003/0110163 A1 | 6/2003 | Chen | G06K 9/6203 |
| 2004/0093323 A1 | 5/2004 | Bluhm | G06F 16/9535 |
| 2004/0260694 A1* | 12/2004 | Chaudhuri | G06F 16/215 |
| 2005/0105712 A1 | 5/2005 | Williams et al. | |
| 2005/0238198 A1* | 10/2005 | Brown | G06K 9/4609 382/103 |
| 2006/0136462 A1* | 6/2006 | Campos | G06F 16/2465 |
| 2006/0161592 A1* | 7/2006 | Ertoz | G06F 21/552 |
| 2006/0179016 A1 | 8/2006 | Forman et al. | |
| 2007/0005556 A1* | 1/2007 | Ganti | G06F 16/27 |
| 2007/0239756 A1* | 10/2007 | Li | G06F 16/951 |
| 2008/0167837 A1* | 7/2008 | Basak | G06K 9/00503 702/179 |
| 2008/0168539 A1 | 7/2008 | Stein | |
| 2008/0205774 A1* | 8/2008 | Brinker | G06F 16/353 382/225 |
| 2008/0219495 A1* | 9/2008 | Hulten | G06F 16/583 382/100 |
| 2009/0216755 A1* | 8/2009 | Itamar | G06F 16/40 |
| 2009/0262925 A1* | 10/2009 | Vijayarangan | H04L 9/0637 380/29 |
| 2009/0271779 A1* | 10/2009 | Clark | G06F 8/71 717/171 |
| 2009/0285489 A1* | 11/2009 | Kanoh | G06K 9/2054 382/190 |
| 2010/0138456 A1* | 6/2010 | Aghili | G06F 16/24557 707/803 |
| 2010/0191734 A1 | 7/2010 | Rajaram et al. | |
| 2011/0087668 A1* | 4/2011 | Thomas | G06F 16/355 707/738 |
| 2011/0087669 A1* | 4/2011 | Ancin | G06F 16/9014 707/740 |
| 2011/0185230 A1 | 7/2011 | Agrawal et al. | |
| 2011/0202744 A1* | 8/2011 | Kulkarni | G06F 12/1018 711/216 |
| 2011/0313953 A1 | 12/2011 | Lane et al. | |
| 2012/0054658 A1 | 3/2012 | Chuat et al. | |
| 2012/0076422 A1* | 3/2012 | Yang | G06K 9/6211 382/201 |
| 2012/0131010 A1* | 5/2012 | Wang | G06K 9/00335 707/743 |
| 2012/0191714 A1* | 7/2012 | Datar | G06F 16/9535 707/737 |
| 2012/0246125 A1* | 9/2012 | Kato | G06F 16/10 707/692 |
| 2012/0253927 A1 | 10/2012 | Qin et al. | |
| 2012/0303623 A1* | 11/2012 | Punera | G06F 16/355 707/738 |
| 2013/0046767 A1* | 2/2013 | Lee | G06F 16/2255 707/747 |
| 2013/0066898 A1* | 3/2013 | Wu | G06F 16/951 707/769 |
| 2013/0318240 A1 | 11/2013 | Hebert et al. | |
| 2014/0046879 A1 | 2/2014 | McAllennan et al. | |
| 2014/0082006 A1* | 3/2014 | Knight | G06F 16/325 707/758 |
| 2014/0304236 A1* | 10/2014 | Hachiya | G06K 9/00718 707/687 |
| 2014/0307958 A1* | 10/2014 | Wang | G06K 9/6256 382/159 |
| 2014/0310476 A1* | 10/2014 | Kruus | G06F 12/0871 711/133 |
| 2014/0344399 A1* | 11/2014 | Lipstone | H04L 41/509 709/217 |
| 2014/0344453 A1* | 11/2014 | Varney | H04L 41/0803 709/224 |
| 2015/0026181 A1* | 1/2015 | Milton | G06Q 30/0269 707/737 |
| 2015/0199224 A1* | 7/2015 | Mihnev | H04L 43/045 714/37 |
| 2015/0213112 A1* | 7/2015 | Malewicz | G06F 16/285 707/737 |
| 2015/0213375 A1* | 7/2015 | Malewicz | G06F 16/137 707/737 |
| 2015/0254267 A1* | 9/2015 | Berg | G06F 16/278 707/692 |
| 2015/0286707 A1* | 10/2015 | Levitan | G06F 16/285 707/737 |
| 2015/0379429 A1 | 12/2015 | Lee et al. | |
| 2016/0085769 A1* | 3/2016 | Penangwala | G06F 16/178 707/610 |
| 2016/0132521 A1* | 5/2016 | Reininger | G06F 16/156 707/739 |
| 2016/0140208 A1* | 5/2016 | Dang | G06F 17/18 707/737 |
| 2016/0246785 A1* | 8/2016 | Sun | G06F 16/174 |
| 2016/0246920 A1* | 8/2016 | Brodsky | G16B 15/00 |
| 2016/0300110 A1* | 10/2016 | Prosek | G06K 9/00718 |
| 2016/0359704 A1* | 12/2016 | Gandham | H04L 41/16 |
| 2016/0378752 A1* | 12/2016 | Anderson | G06F 16/245 707/747 |
| 2017/0147575 A1* | 5/2017 | Pappu | H04W 4/023 |
| 2017/0177705 A1* | 6/2017 | Malewicz | G06F 16/285 |
| 2017/0185761 A1* | 6/2017 | Stanwood | H04L 9/0866 |
| 2017/0279889 A1* | 9/2017 | Boss | H04L 67/42 |
| 2017/0286544 A1* | 10/2017 | Hunt | H04L 63/1416 |

FOREIGN PATENT DOCUMENTS

| | | |
|---|---|---|
| CN | 103744964 | 4/2014 |
| CN | 104035949 | 9/2014 |
| CN | 104391908 | 3/2015 |
| JP | H0261769 | 3/1990 |
| JP | 2004349846 | 12/2004 |
| WO | 2008020991 | 2/2008 |
| WO | 2012130782 | 10/2012 |
| WO | 2012150316 | 11/2012 |
| WO | 2012151198 | 11/2012 |

OTHER PUBLICATIONS

Michele Covell et al., LSH Banding for Large-Scale Retrieval With Memory and Recall Constraints, 2009, 2009 IEEE (Year: 2009).*

Spiros Papadimitriou et al., LOCI: Fast Outlier Detection Using Lcal Correlation Integral, 2003, 2003 IEEE (Year: 2003).*

Markus Goldstein, FastLOF: An Expectation-Maximization based Local Outlier Detection Algorithm, Nov. 11-15, 2012, 21st International Conference on Pattern Recognition (ICPR 2012) Nov. 11-15, 2012. Tsukuba, Japan (Year: 2012).*

Pillutla et al.; LSH Based Outlier Detection and Its Application in Distributed Setting; CIKM'11, Oct. 24-28, 2011, Glasgow, Scotland, UK.; ACM (Year: 2011).*

Wang et al.; Locality Sensitive Outlier Detection: A Ranking Driven Approach; IEEE (Year: 2011).*

(56) References Cited

OTHER PUBLICATIONS

Yu et al.; FindOut: Finding Outliers in Very Large Datasets; Springer-Verlag London Ltd. (Year: 2002).*
Koga et al.; Fast agglomerative hierarchical clustering algorithm using Locality-Sensitive Hashing; Knowledge and Information Systems (Year: 2007).*
Madhuchand Rushi Pillutla et al., LSH Based Outlier Detection and Its Application in Distributed Setting, Oct. 24-28, 2011, CIKM'11, Oct. 24-28, 2011, Glasgow, Scotland, UK. (Year: 2011).*
Suat Ozdemir et al., Outlier Detection Based Fault Tolerant Data Aggregation for Wireless Sensor Networks, 2011, 2011 IEEE (Year: 2011).*
Ye Wang et al., Locality Sensitive Outlier Detection: A Ranking Driven Approach, 2011, 2011 IEEE (Year: 2011).*
Chyouhwa Chen et al., Locality sensitive hashing for sampling-based algorithms in association rule mining, 2011, 2011 Elsevier Ltd. (Year: 2011).*
Giatrakos et al.; In-network approximate computation of outliers with quality guarantees; Elsevier (Year: 2011).*
Teixeira et al.; Min-Hash Fingerprints for Graph Kernels: A Trade-off among Accuracy, Efficiency, and Compression; Journal of Information and Data Management, vol. 3, No. 3 (Year: 2012).*
Bay et al.,; Mining Distance Based Outliers in Near Linear Time with Randomization and a Simple Pruning Rule; ACM (Year: 2003).*
Aghasaryan et al.; On the use of LSH for Privacy Preserving Personalization; 2013 12th IEEE International Conference on Trust, Security and Privacy in Computing and Communications (Year: 2013).*
Thomas Dean et al., Fast, Accurate Detection of 100,000 Object Classes on a Single Machine, 2013, 2013 IEEE Conference on Computer Vision and Pattern Recognition (Year: 2013).*
Haiying Shen et al., An Efficient Similarity Searching Scheme in Massive Databases, 2008 The Third International Conference on Digital Telecommunications (icdt 2008) (Year: 2008).*
Matthias Reif, et al., "Anomaly Detection by Combining Decision Trees and Parametric Densities", 19th International Conference on Pattern Recognition, 2008: ICPR 2008; Dec. 8-11, 2008, pp. 1-4.
Sridhar Ramaswamy, et al., "Efficient Algorithms for Mining Outliers from Large Data Sets", SIGMOD Record, ACM, vol. 29, No. 2, May 16, 2000, pp. 427-438.
Victoria J. Hodge, et al., "A Survey of Outlier Detection Methodologies", Artificial Intelligence Review 22; 2004, pp. 85-126.
"Amazon Kinesis Streams Developer Guide", Amazon Web Services, 2016, pp. 1-133.
Wikipedia, "Locality-sensitive hashing", Retrieved from URL: http:en.wikipedia.org/wiki/Locality-sinsitive_hashing on Mar. 21, 2016, pp. 1-9.
"Amazon Machine Learning Developer Guide", Amazon Web Services, Last Documentation update Mar. 21, 2016, pp. 1-143.
Malcolm Slaney, et al., "Optimal Parameters for Locality-Sensitive Hashing", Proceedings of the IEEE, vol. 100, No. 9, Sep. 2012, pp. 2604-2623.
U.S. Appl. No. 14/990,175, filed Jan. 7, 2016, Nina Mishra.
Leonid Kalinichenko, et al., "Methods for Anomaly Detection: a Survey", Proceedings of the 16th All-Russian Conference Digital Libraries: Advance Methods and Technologies, Digital Collections (RCDL-2014), Oct. 13-16, 2014, pp. 20-25.
Andrew Emmott, et al., "Systematic Construction of Anomaly Detection Benchmarks from Real Data", ACM Transactions on Knowledge Discovery from Data, Feb. 2015, pp. 1-27.
Pavlos S. Efraimidis, et al., "Weighted Random Sampling", Elsevier, Information Processing Letters, vol. 97, Issue 5, Mar. 16, 2006, pp. 181-185.

Frank Den Hollander, "Probability Theory: The Coupling Method", Retrieved from URL: http://websites.math.leidenuniv.nl/probability/lecturenotes/CouplingLectures.pdf, pp. 1-73.
Vladimir Vovk, et al., "Testing Exchangeability On-Line", Proceedings of the Twentieth International Conference on Machine Learning (ICML-2003), 2003, pp. 1-8.
Swee Chuan Tan, et al., "Fast Anomaly Detection for Streaming Data", IJCAI Proceedings of the Twenty-Second International Joint Conference on Artificial Intelligence, 2011, pp. 1511-1516.
Amazon Kinesis Developer Guide, Amazon Web Services, API Version, Dec. 2, 2013, pp. 1-51.
Amazon Machine Learning Developer Guide, Amazon Web Services, Version Latest Dec. 10, 2015, pp. 1-141.
Charu C. Aggarwal, "Outlier Analysis", In Data Mining, Springer International Publishing, 2015, pp. 237-263.
Jeffrey Scott Vitter, "Random Sampling with a Reservoir", ACM Transactions on Mathematical Software, vol. 11, No. 1, Mar. 1985, pp. 37-57.
Fei Tony Liu, et al., "Isolation-based Anomaly Detection", ACM Transactions on Knowledge Discovery from Data (TKDD), vol. 6, No. 1, Mar. 2012, pp. 1-44.
U.S. Appl. No. 15/084,343, filed Mar. 29, 2016, Gaurav D. Ghare.
U.S. Appl. No. 14/108,247, filed Dec. 16, 2013, David Craig Yanacek.
Federated Identity Management in Foundations of Security Analysis and Design V, Chadwick, David W., Jan. 1, 2009, published by Springer Berlin Heidelberg, pp. 96-120.
U.S. Appl. No. 14/319,902, filed Jun. 30, 2014, Leo Parker Dirac.
International Search Report and Written Opinion from PCT/US2015/038608, Amazon Technologies, Inc., dated Oct. 16, 2015, Amazon Technologies, Inc., pp. 1-14.
Soren Sonnenburg, et al., "The SHOGUN Maching Learning Toolbox," Journal of Machine Learning Research, Jan. 1, 2010, pp. 1799-1802, XP055216366, retrieved from http://www.jmlr.org/papers/volume11/sonnenburg10a/sonnenburg10a.pdf.
Anonymous: "GSoC 2014 Ideas," Internet Citation, Jun. 28, 2014, XP882745876, Retrieved from http://web.archive.org/web/20140628051115/http://shogun-toolbox.org/page/Events/gsoc2014ideas [retrieved on Sep. 25, 2015] Section "Shogun cloud extensions"; pp. 1-5 (13).
Anonymous: "Blog Aug. 21, 2013", The Shogun Machine Learning Toolbox, Aug. 21, 2013, XP002745300, Retrieved from http://shogun-toolbox.org/page/contact/irclog/2013-08-21/, [retrieved on 2815-18-81], pp. 1-5.
Pyrathon D.: "Shogun as a SaaS", Shogun Machine Learning Toolbox Mailing List Archive, Mar. 4, 2014, XP882745382, Retrieved from http://comments.gmane.org/gmane.comp.ai.machine-learning.shogun/4359, [retrieved on 2815-18-81], pp. 1-3 (paragraph [8881]).
International Search Report and Written Opinion from PCT/US2015/038610, dated Sep. 25, 2015, Amazon Technologies, Inc., pp. 1-12.
Kolo, B., "Binary and Multiclass Classification, Passage", Binary and Multiclass Classification, XP002744526, Aug. 12, 2010, pp. 78-80.
Gamma, E., et al., "Design Patterns, Passage", XP002286644, Jan. 1, 1995, pp. 293-294; 297, 300-301.
International Search Report and Written Opinion from PCT/US2015/038589, dated Sep. 23, 2015, Amazon Technologies, Inc., pp. 1-12.
"API Reference", Google Prediction API, Jun. 12, 2013, 1 Page.
"Google Prediction API", Google Developers, Jun. 9, 2014, 1 Page.
Fei Tony Liu et al, "Isolation Forest", 2008 Eighth IEEE International Conference on Data Mining, Dated Dec. 19, 2008, pp. 413-422.
Liu, Fei Tony, et al., "Isolation forest." In 2008 Eighth IEEE International Conference on Data Mining,IEEE, 2008, pp. 413-422.

* cited by examiner

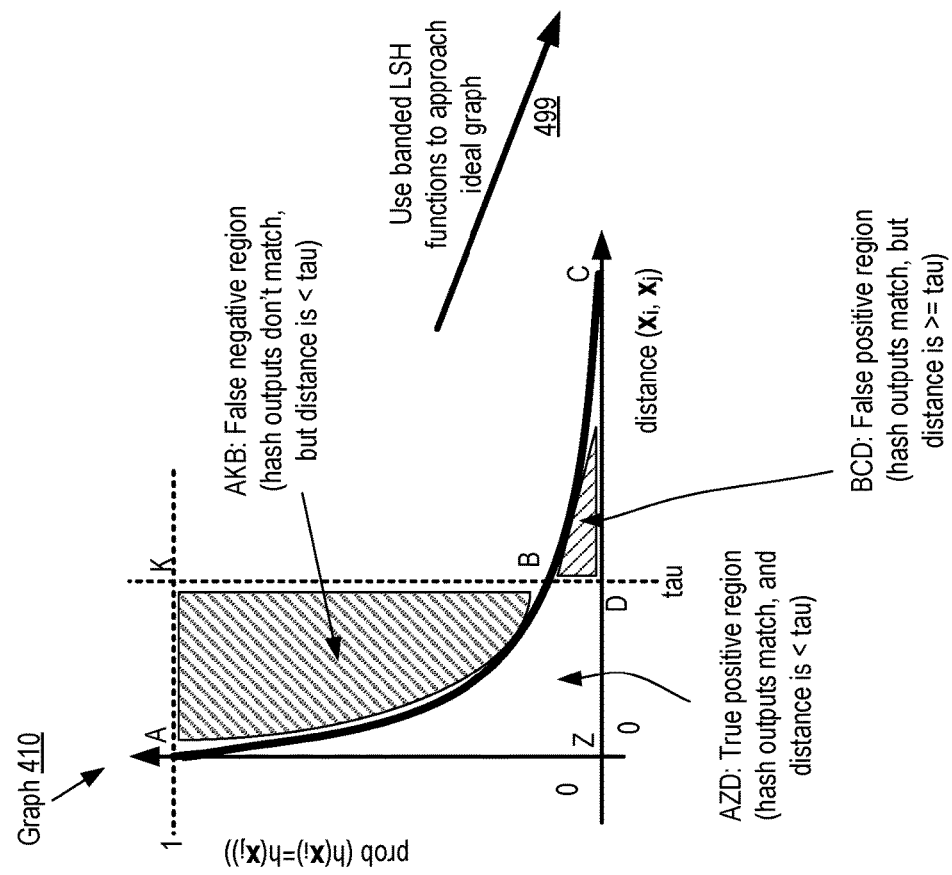
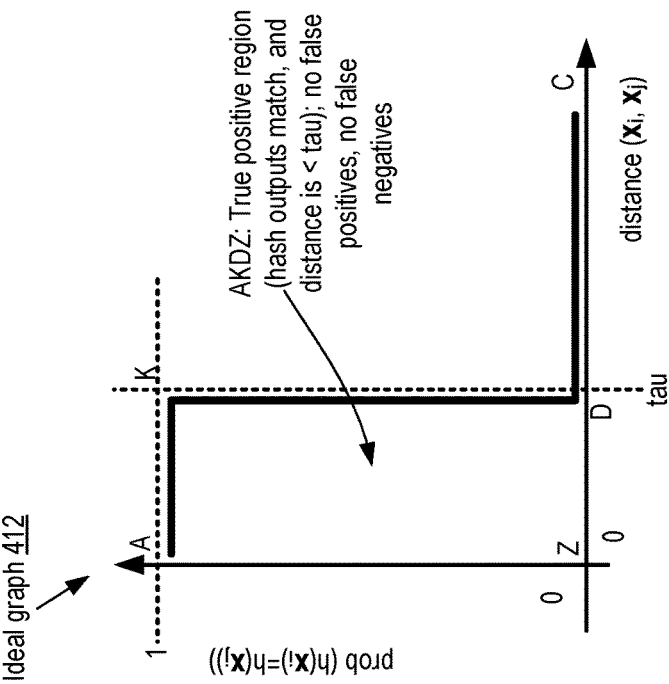
FIG. 4

Parameters 702 for banded-LSH algorithm to be used for single-attribute stream data records

| alpha = 0.25 | |
|---|---|
| w=4, b=2, r=2 | |
| $h_1$ | p=0.5, q=1 |
| $h_2$ | p=0.2, q=2 |
| $h_3$ | p=0.7, q=3 |
| $h_4$ | p=0.2, q=4 |

Band 1: $h_1$, $h_2$
Band 2: $h_3$, $h_4$

Hash function formula 704

$$h(x_i) = \text{floor}((x_i.p + q)/w)$$

Table 708 (first four data records)

| stream data record id | value of x | $h_1(x)$ | $h_2(x)$ | $h_3(x)$ | $h_4(x)$ |
|---|---|---|---|---|---|
| $x_1$ | 4 | 0 | 0 | 1 | 1 |
| $x_2$ | 2 | 0 | 0 | 1 | 1 |
| $x_3$ | 3 | 0 | 0 | 1 | 1 |
| $x_4$ | 6 | 1 | 0 | 1 | 1 |

New data record and hash outputs table 710

| | value of x | $h_1(x)$ | $h_2(x)$ | $h_3(x)$ | $h_4(x)$ |
|---|---|---|---|---|---|
| $x_5$ | 9 | 1 | 0 | 2 | 1 |

Outlier detection analysis details table 715 for new data record

| Matching record sets w.r.t $x_5$ | |
|---|---|
| $S_1$ (for $h_1$) | {$x_4$} |
| $S_2$ (for $h_2$) | {$x_1$, $x_2$, $x_3$, $x_4$} |
| $S_3$ (for $h_3$) | {} (empty set) |
| $S_4$ (for $h_4$) | {$x_1$, $x_2$, $x_3$, $x_4$} |
| $S'_1$ (for band 1) | {$x_4$} |
| $S'_2$ (for band 2) | {} (empty set) |
| $S'_{all}$ | {$x_4$} |
| pop($S'_{all}$) | 1 |
| alpha*i | 0.25*5 = 1.25 |
| pop(S'all) <= alpha*i | TRUE |
| outlier status of $x_5$ | outlier |

FIG. 7

```
┌─────────────────────────────────────────────────────────────────────┐
│ Determine that a streaming data set is to be analyzed to identify   │
│ outliers based on distance threshold parameter tau and sparsity     │
│ parameter alpha   801                                               │
└─────────────────────────────────────────────────────────────────────┘
                                   │
                                   ▼
┌─────────────────────────────────────────────────────────────────────┐
│ Select parameters for memory-efficient min-wise-hashing based banded│
│ LSH algorithm {b, r, {$h_j$}, u, {$g_l$}}, e.g., based on factors such as   │
│ the distance threshold, and initialize sketch data structure (e.g., │
│ signature vectors of length u corresponding to each LSH output      │
│ bucket, and total count of records N which hashed to the bucket) 804│
└─────────────────────────────────────────────────────────────────────┘
                                   │
                                   ▼
┌─────────────────────────────────────────────────────────────────────┐  ◄──┐
│         Receive $i^{th}$ data record $x_i$ of stream   807                    │     │
└─────────────────────────────────────────────────────────────────────┘     │
                                   │                                        │
                                   ▼                                        │
┌─────────────────────────────────────────────────────────────────────┐     │
│ Obtain LSH output value $h_j(x_i)$ for each of the b*r banded LSH       │     │
│ functions, and obtain u hash values $g_l(x_i)$ for possible min-hash    │     │
│ signature updates based on $x_i$   810                                  │     │
└─────────────────────────────────────────────────────────────────────┘     │
                                   │                                        │
                                   ▼                                        │
┌─────────────────────────────────────────────────────────────────────┐     │
│ For each band, determine approximate signatures and approximate     │     │
│ population of matching record set $S'_j$ using the min-hash signatures  │     │
│ of the buckets to which $x_i$ is hashed by the band (approximate        │     │
│ signatures may contain invalidity tokens)   813                     │     │
└─────────────────────────────────────────────────────────────────────┘     │
                                   │                                        │
                                   ▼                                        │
┌─────────────────────────────────────────────────────────────────────┐     │
│ From the approximate signatures/populations of $S'_j$ for all the       │     │
│ individual bands, determine approximate signatures and approximate  │     │
│ population of matching record set $S'_{all}$   816                      │     │
└─────────────────────────────────────────────────────────────────────┘     │
                                   │                                        │
                                   ▼                                        │
                         ◇ Approx. pop($S'_{all}$) <= (alpha*i)? 819 ◇          │
                    No  ╱                                  ╲                │
              ┌────────                                      Yes            │
              │                                               │             │
              │                                               ▼             │
              │        ┌──────────────────────────────────────────────────┐ │
              │        │ Store and/or programmatically provide indication │ │
              │        │ that $x_i$ is an outlier   822                       │ │
              │        └──────────────────────────────────────────────────┘ │
              ▼                                               │             │
┌─────────────────────────────────────────────────────────────────────┐     │
│ Optionally, store and/or programmatically provide indication that   │     │
│ $x_i$ is not an outlier   825                                           │     │
└─────────────────────────────────────────────────────────────────────┘     │
                                   │                                        │
                                   ▼                                        │
┌─────────────────────────────────────────────────────────────────────┐     │
│ Based on $g_l(x_i)$, update min-hash signatures of the buckets to which │     │
│ $x_i$ is hashed by the b*r LSH functions if needed   828                │     │
└─────────────────────────────────────────────────────────────────────┘     │
                                   │                                        │
                                   ▼                                        │
                         Increment i   831  ─────────────────────────────────┘
```

FIG. 8

Table 902

| stream data record id | value of x | $h_1(x)$ | $h_2(x)$ | $h_3(x)$ | $h_4(x)$ | $g_1(x)$ | $g_2(x)$ |
|---|---|---|---|---|---|---|---|
| $x_1$ | 4 | 0 | 0 | 1 | 1 | 21 | 9 |
| $x_2$ | 2 | 0 | 0 | 1 | 1 | 7 | 23 |
| $x_3$ | 3 | 0 | 0 | 1 | 1 | 15 | 12 |
| $x_4$ | 6 | 1 | 0 | 1 | 1 | 3 | 18 |
| $x_5$ | 9 | 1 | 0 | 2 | 1 | 6 | 22 |

Functions g1 and g2 are used for 2-dimensional min-hash signatures for h(x) buckets Bucket state 910A (after $x_1$ is processed)

| $h_1(x) = 0$:<br>N = 1, Sig = (21,9) | $h_2(x) = 0$:<br>N = 1, Sig = (21,9) | $h_3(x) = 1$:<br>N = 1, Sig = (21,9) | $h_4(x) = 1$:<br>N = 1, Sig = (21,9) |

Bucket state 910B (after $x_2$ is processed)

| $h_1(x) = 0$:<br>N = 2, Sig = (7,9) | $h_2(x) = 0$:<br>N = 2, Sig = (7,9) | $h_3(x) = 1$:<br>N = 2, Sig = (7,9) | $h_4(x) = 1$:<br>N = 2, Sig = (7,9) |

Bucket state 910C (after $x_3$ is processed)

| $h_1(x) = 0$:<br>N = 3, Sig = (7,9) | $h_2(x) = 0$:<br>N = 3, Sig = (7,9) | $h_3(x) = 1$:<br>N = 3, Sig = (7,9) | $h_4(x) = 1$:<br>N = 3, Sig = (7,9) |

Bucket state 910D (after $x_4$ is processed)

| $h_1(x) = 0$:<br>N = 3, Sig = (7,9) | $h_1(x) = 1$:<br>N = 1, Sig = (3,18) | $h_2(x) = 0$:<br>N = 4, Sig = (3,9) | $h_3(x) = 1$:<br>N = 4, Sig = (3,9) | $h_4(x) = 1$:<br>N = 4, Sig = (3,9) |

Bucket state 910E (after $x_5$ is processed)

| $h_1(x) = 0$:<br>N = 3, Sig = (7,9) | $h_1(x) = 1$:<br>N = 2, Sig = (3,18) | $h_2(x) = 0$:<br>N = 5, Sig = (3,9) | $h_3(x) = 1$:<br>N = 4, Sig = (3,9) | $h_4(x) = 1$:<br>N = 5, Sig = (3,9) |
| | | | $h_3(x) = 2$:<br>N = 1, Sig = (6,22) | |

FIG. 9

OUTLIER DETECTION FOR STREAMING DATA USING LOCALITY SENSITIVE HASHING

BACKGROUND

As the costs of data storage have declined over the years, and as the ability to interconnect various elements of the computing infrastructure has improved, more and more data pertaining to a wide variety of applications can potentially be collected and analyzed. The analysis of data collected from sensors embedded at various locations within airplane engines, automobiles, health monitoring devices or complex machinery may be used for numerous purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may also be analyzed to prevent server failures.

The increase in volumes of streaming data has been accompanied by (and in some cases made possible by) the increasing use of commodity hardware. The advent of virtualization technologies for commodity hardware has provided benefits with respect to managing large-scale computing resources for many types of applications, allowing various computing resources to be efficiently and securely shared by multiple customers. For example, virtualization technologies may allow a single physical computing machine to be shared among multiple users by providing each user with one or more virtual machines hosted by the single physical computing machine. Each virtual machine can be thought of as a software simulation acting as a distinct logical computing system that provides users with the illusion that they are the sole operators and administrators of a given hardware computing resource, while also providing application isolation and security among the various virtual machines. In addition to computing platforms, some large organizations also provide various types of storage services built using virtualization technologies. Using such storage services, large amounts of streaming data can be stored with desired availability and durability levels in a cost-effective manner, with a given physical storage device potentially being used to hold data records of many different service customers.

As the volumes at which streaming data can be produced increase, the need for analysis tools that work on streaming data has also increased. For example, for some security-related applications or health-related applications, the ability to identify data outliers (i.e., unusual or anomalous data records or data patterns) fairly quickly may be critical. Unfortunately, many of the machine learning and statistical algorithms which have been developed over the years for such tasks were either designed primarily with static data sets in mind, or are difficult to scale for streaming data. As a result, identifying anomalous data efficiently within high-volume streams remains a challenging problem

BRIEF DESCRIPTION OF DRAWINGS

FIG. 4 illustrates examples of actual and ideal matching-hash-output probability graphs as a function of inter-record distances, according to at least some embodiments.

FIG. 7 illustrates a simple example of identifying outliers in a one-dimensional data set using banded locality sensitive hashing, according to at least some embodiments.

FIG. 8 is a flow diagram illustrating aspects of operations that may be performed to implement a space-efficient algorithm relying on min-hash signatures and banded locality sensitive hashing to identify outliers within a data stream, according to at least some embodiments.

FIG. 9 illustrates examples of min-hash signatures which may be generated for hash buckets corresponding to locality sensitive hash function outputs, according to at least some embodiments.

Figure 1:
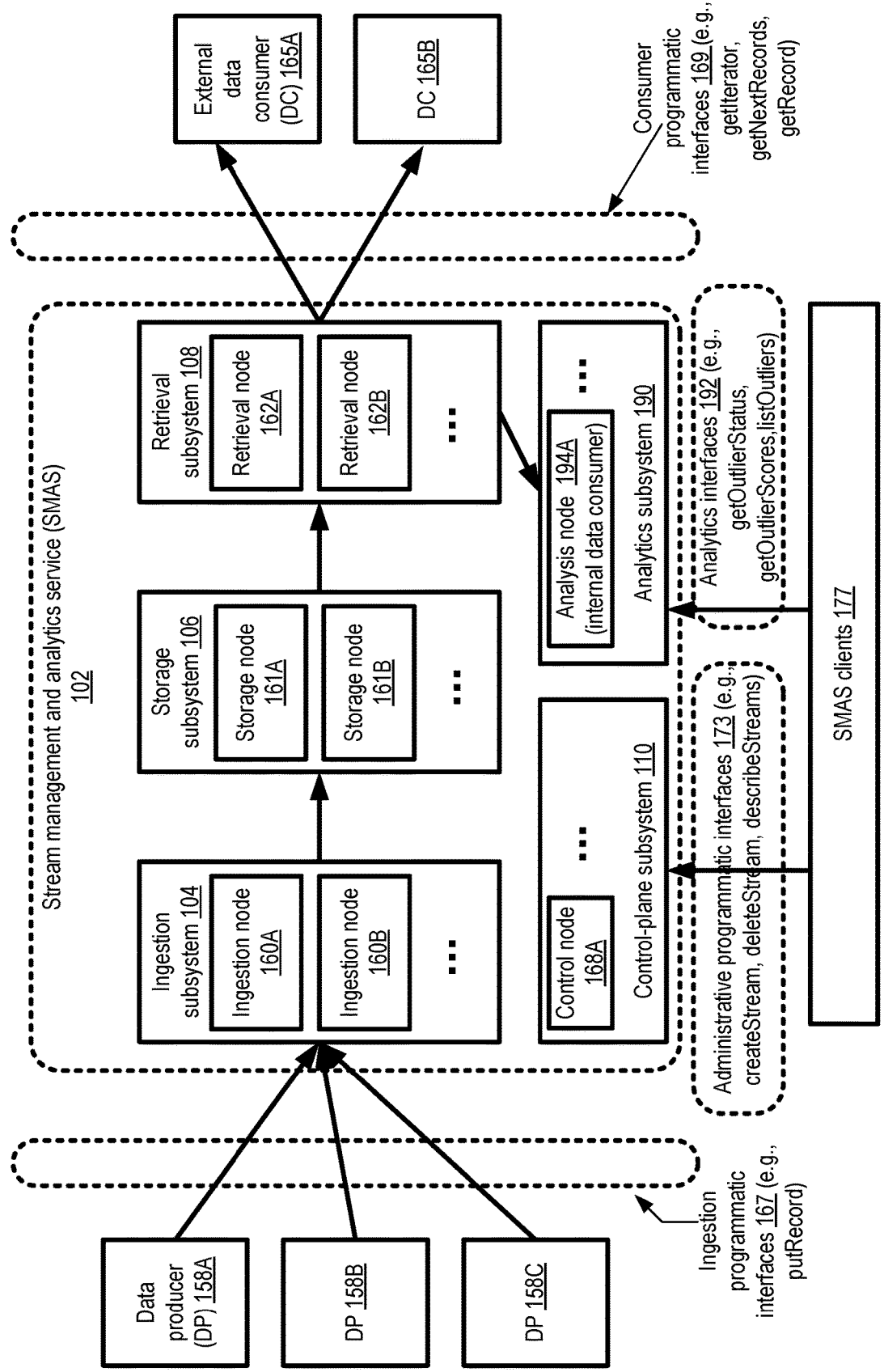
FIG. 1 illustrates an example system environment in which outlier detection may be performed on stream data records, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for detecting outliers or anomalous records in streaming data sets using locality sensitive hashing are described. The terms "stream" or "streaming data set", as used herein, refer to a sequence of records that may be generated by one or more data producers and accessed by zero or more data consumers, where each record is assumed to be a sequence of bytes representing values of one or more attributes. The records of a stream may also be referred to as observation records, observations, points, or data records herein, and the data producers may be referred to as streaming data sources. In some embodiments, outlier detection may be performed at one or more computing devices of a network-accessible analytics service, while in other embodiments outlier detection may be performed at client-side devices at which the data records may be collected locally via sensors (e.g., wearable health-monitoring devices, home assistant devices, environment data collection devices, and the like), and/or by standalone outlier detector tools which may not necessarily be affiliated with or part of a network-accessible service.

In one embodiment, a stream management and analytics service (SMAS) may provide programmatic interfaces (e.g., application programming interfaces (APIs), web pages or web sites, graphical user interfaces, or command-line tools) to enable the creation, configuration and deletion of streams. The programmatic interfaces may also enable the submission, storage, analysis (including outlier detection), transformation and/or retrieval of stream data records in some embodiments. Dynamically provisioned sets of compute, storage and networking resources may be used to implement the service in various embodiments, based for example on various partitioning policies that allow the stream management workload to be distributed in a scalable fashion among numerous service components.

In at least some embodiments, clients of the SMAS may request the detection of unusual or anomalous observation records in a specified stream using the SMAS programmatic interfaces. (The terms "outlier" and "anomaly" may be used synonymously herein to refer to such records.) In response to such a request, the service may provide the results of applying an efficient locality sensitive hashing (LSH) based outlier detection algorithm on the stream's observation records in various embodiments. A number of different variants of LSH-based outlier techniques may be used in different embodiments as described below, with the variants differing from one another in characteristics such as whether LSH functions are grouped into bands or not, whether min-wise hashing signatures are used to represent hash buckets or not, whether clients supply the inter-record distance thresholds used for outlier detection or not, and so on. At least in some embodiments, instead of computing and/or storing actual inter-record distance metrics, which can become quite expensive for large data streams, LSH-based schemes may rely on probabilistic approximations regarding inter-record distances, and may consequently be much more efficient than some other outlier detection techniques.

According to one embodiment, one or more inter-record distance-based criteria may be selected for identifying outliers within a data stream. For simplicity, consider a streaming data set whose data records $x_i$ (where i indicates the sequence in which the records are observed or collected) comprise normalized numeric attribute values $x_{i1}, x_{i2}, \ldots,$ such that inter-record Euclidean distances $d((x_i, x_j))$ are computable for any given pair of data records $x_i$ and $x_j$. Thus, the first data record of the stream may be labeled $x_1$, the second $x_2$, and so on. In one approach to defining outliers with respect to such a data set, a given point $x_i$ may be designated as an (alpha, tau) outlier if the number of data points in the already-observed data points $x_1, x_2, \ldots, x_{i-1}$ of the stream which lie within Euclidean distance tau is no more than (alpha*i). Intuitively, in this approach, the distance threshold tau may define a neighborhood (in k-dimensional space, where k is the number of attributes of each record), and the fraction of the stream's already-encountered records that lie within that neighborhood of any given stream data record may determine whether that record is considered an outlier. If the fraction is low, this would indicate that relatively few "similar" data records have been observed in the stream thus far, and so the record being considered is likely to be an outlier. In contrast, if the fraction is high, this would indicate that many "similar" data records have been encountered in the stream, and so the record being considered is probably not an outlier. In this simple formulation, an inter-record distance-based criterion for outlier detection may be characterized by the two parameters (alpha, tau)—that is, in order to be able to designate a record as an outlier, the distance threshold tau and the population-fraction alpha both may have to be known to the outlier detector. In some embodiments in which outlier detection is initiated in response to a programmatic request from a client of an SMAS or a client of an outlier detection tool, the client may indicate both these parameters. In other embodiments as discussed in further detail below, one or both of the parameters may be chosen by the outlier detector tool or service. In the remainder of this document, the symbol $\tau$ and the word "tau" may be used synonymously. Similarly, the symbol a and the word "alpha" may also be used synonymously.

It is noted that distance metrics other than Euclidean distance, such as metrics based on cosine similarity or Jaccard's distance may be used in at least some embodiments to define inter-record distance thresholds to be used for detecting outliers. In much of the remainder of this document, to simplify the presentation, Euclidean distance will be used as the example distance measure, and it will be assumed that the data record attribute values have been normalized and/or pre-processed (if such normalizing and/or pre-processing is required) to enable Euclidean distances between a given pair of data records to be computed if desired.

In at least some embodiments, a set of locality sensitive hash functions may be selected to process the stream's records using the distance-based outlier detection criterion selected for the stream. Generally speaking, the output of locality sensitive hash functions tends to map "similar" items to the same hash buckets. Any of a number of different types of locality sensitive hash functions may be used in different embodiments. The set of selected hash functions may be subdivided into a number of bands, with each band including some number of independent hash functions in at least some embodiments. The number of bands, as well as the number of hash functions included in each band, may represent algorithm parameters which may be selected by a client or by the outlier detection system. The range of output values of the hash functions may be the same for all the selected hash functions in at least some embodiments, as the algorithm may rely on matches among hash output values to identify "similar" data records (i.e., records within a distance threshold).

Each record of the stream may be provided as input to the hash functions of the set, and the corresponding output values produced by the hash functions may be obtained. With respect to a given data record and a particular band of hash functions, a matching record set may be identified in some embodiments based on the matches between the band's output hash values for the records. For example, if a particular band b1 contains just two hash functions h1 and h2, and the hash output values for record $x_k$ produced by h1 and h2 match the respective output values for record $x_j$ produced by h1 and h2, $x_j$ may be added to the matching record set with respect to $x_k$ and b1. Similar matching record sets may be generated for each of the bands. Then, using the matching record sets for the individual bands, an overall matching record set corresponding to all the bands taken together may be generated, e.g., using set union logic. The member count or population of the overall matching record set may be determined. The population of the overall matching record set maybe used as an estimate of the number of stream data points which meet the distance-based criterion with respect to the current data record which is being examined to determine whether it is an outlier. A representation of an outlier status of the current data record, based at least in part on the estimate of the count of data records which meet the particular distance-based criterion, may be stored and/or provided to a client of the outlier detection system or tool in at least some embodiments.

The results of the outlier detection algorithm may be indicated or stored in any of several different formats in different embodiments. For example, in one embodiment a binary result (e.g., "outlier" or "not an outlier") may be generated for a given data record and the set of data records observed thus far based on a particular distance-based metric. In other embodiments, as described below, numeric outlier scores, which may be based on the distance between a given data record $x_i$ and its $(i*alpha)^{th}$ closest neighbor may be generated for each data record, and such outlier scores (or the records with the top 100 such scores) may be stored or displayed as the output of the outlier detector. In one embodiment, only those data records which are identified as outliers, or whose outlier scores meet a threshold level, may be indicated; most data records may be "normal" or "inliers", and explicit outlier detection results may not be provided for such normal records. In one embodiment, a programmatic interface based at least in part on a version of SQL (Structured Query Language) or some other commonly-used query language may be implemented by an SMAS or outlier detector tool to enable clients to specify the details of the results they wish to obtain—e.g., whether some or all of the attribute values of the observation records should be indicated together with outlier status or scores, how many of the most anomalous records seen thus far should be indicated, and so on.

Some of the calculations used during the banded LSH algorithm for outlier detection may involve the determination of set intersections (for identifying per-band matching record sets corresponding to output hash values) and set unions (for determining the overall multi-band matching record sets). In some implementations, in order to compute the results of such set operations, the identifiers (or other metadata) of the set members may be retained during at least a portion of the stream processing. This would imply that as more and more data records of the stream arrive and are processed, the amount of storage space used for the algorithm's data may keep increasing. In at least some embodiments, a space-optimizing approximation technique involving the use of min-wise hashing signatures may employed. In such a scheme, a fixed-width hash signature, obtained using an additional set of hash functions (e.g., hash functions which are not part of the banded LSH function set) may be used to represent hash buckets (i.e., the data records that were mapped to the hash buckets). Approximate signatures and set populations corresponding to set unions and intersections may be obtained from these min-wise per-hash-bucket signatures as described in greater detail below. In various embodiments, the amount of space required for detecting outliers may be substantially reduced if such signatures are used instead of maintaining identifiers of the data records which correspond to hash buckets. Of course, some information may be lost as a result of the use of min-hash signatures, but at least in some embodiments outliers may be detected with a desired level of accuracy for most data sets using the space-efficient technique.

In at least one embodiment, the outlier detector tool or service may select various parameters to be used during outlier detection as mentioned above. In one embodiment, several different distance-based thresholds (e.g., $tau_1$, $tau_2$, . . . ) may be selected for a given data stream, and LSH-based analysis may then be performed with respect to each of the distance thresholds for each data record. Using such a collection of thresholds instead of a single predetermined distance threshold, it may become possible to determine outlier scores which are distance-threshold-independent (at least from the perspective of the customer, who is not required to specify particular distance threshold), as described below in further detail. A high outlier score may correspond to a data record with relatively few near neighbors, while a low outlier score may be designated for a data record with many near neighbors.

In at least one embodiment, the SMAS or the outlier detector tool may be implemented as a subcomponent of a more general machine learning service of a provider network environment. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. In some embodiments, a machine learning service of a provider network may be designed to handle both batch jobs on static collections of observation records, and real-time tasks (including real-time outlier detection) on streaming data. In some cases, the records of a given stream may be stored at a repository of the machine learning service after they are received, and may be analyzed or re-analyzed in batch mode later.

Example System Environment

FIG. 1 illustrates an example system environment in which outlier detection may be performed on stream data records, according to at least some embodiments. As shown, system 100 includes various resources of a stream management and analysis service (SMAS) 102, organized according to a scalable layered architecture with respective subsystems for receiving, storing, analyzing and providing read access to streaming data. SMAS 102 may comprise an ingestion subsystem 104, a storage subsystem 106, a retrieval subsystem 108, a control-plane subsystem 110 and an analytics subsystem 190 in the depicted embodiment. Each subsystem's resources may be scaled up or down independently of the other subsystems in the depicted embodiment—e.g., if the analytics algorithms being run require additional computational power, more servers may be added to the analytics subsystem 190 without modifying resources at other subsystems. In general, the SMAS may be used by a variety of clients for respective applications in a provider network environment, and not just for outlier detection. In some embodiments, the SMAS may be used to construct pipelined applications with workflows of arbitrary complexity, in which for example processing results generated from one stream may form the input data records of a second stream, the second stream may be processed to generate input data of a third and fourth stream, and so on. The contents of each such stream may be stored in a persistent fashion, e.g., by replicating raw and/or processed stream records at numerous nodes to provide desired levels of availability and data durability.

Generally speaking, each of the subsystems 104, 106, 108, 110 and 190 may include one or more nodes or components, implemented for example using respective executable threads or processes instantiated at various servers or hosts of a provider network. Nodes of the ingestion subsystem 104 may be configured (e.g., by nodes of the control subsystem 110) to obtain or receive data records of a particular data stream from data producers 158, and each ingestion node 160 may pass received data records on to corresponding nodes of the storage subsystem 106. Data producers 158, such as 158A-158C, may include a wide variety of data sources, such as an array of sensors, logs of web applications, security cameras, and the like in various embodiments. In some cases the sensors may be incorporated within client devices such as wearable health-monitoring devices and the like. The storage subsystem nodes 161 (e.g., 161A or 161B) may save the data records on any of various types of storage devices (e.g., solid-state drives (SSDs), rotating magnetic disk-based devices, or volatile memory devices) in accordance with a persistence policy selected for the stream. Nodes 162 (e.g., 162A or 162B) of the retrieval subsystem 108 may respond to read requests from external data consumers such as 165A or 165B (which may include, for example, applications to which processed stream data is provided as input) and/or internal data consumers such as analysis node 194A of analytics subsystem 190. The analysis nodes 194 (such as 194A) may be configured to execute or implement a number of different types of statistical or machine learning algorithms in various embodiments, e.g., to provide responses to requests received from SMAS clients 166 regarding specified streams. The control subsystem 110 may include a number of control nodes 168, such as node 168A, collectively responsible for administrative operations such as creating or deleting streams, partitioning streams and the like.

A given stream may be subdivided into partitions (which may also be referred to as shards) in some embodiments. In the depicted embodiment, respective sets of one or more nodes may be designated for each partition of a stream, e.g., at least with respect to the ingestion subsystem, the storage subsystem and the retrieval subsystem. For example, ingestion node 160A may be set up for partition 0 of stream S1, ingestion node 160B may be set up for partition 1 of stream S1, and so on. Similarly, one or more storage subsystem nodes 161 may be set up for each partition, respective sets of retrieval nodes 162A may be set up for each partition as well. In some embodiments, respective subsets of the resources of the analytics subsystem 190 may also be assigned to respective stream partitions.

In the embodiment depicted in FIG. 1, SMAS clients 177 may utilize one or more sets of administrative programmatic interfaces 173 to interact with the control-plane subsystem 110. Similarly, data producers 158 may use producer programmatic interfaces 167 to submit data records, and data consumers may use consumer programmatic interfaces 169 to read the stored records. Some clients 177 may submit data analysis requests for their streams using analytics interfaces 192. A few specific examples of APIs (application programming interfaces) that may be used for submitting stream data records, retrieving stored stream data records, requesting analyses, and/or requesting administrative operations in various embodiments are also shown in FIG. 1. For example, data producers 158 may use a "putRecord" API to submit a data record into a specified stream (or a specified partition of a specified stream). In at least some embodiments, a sequencing indicator (such as a sequence number) may be associated with each data record that is stored by the SMS, and the records of a given stream may be retrievable either in sequence number order or in random order. A "getIterator" API may be used by a data consumer to indicate a starting position or starting sequence number within a stream or partition in the depicted embodiment, and a "getNextRecords" API may be used to retrieve records in sequential order from the iterator's current position. A "getRecord" API may also be supported in the depicted embodiment, e.g., for random accesses that do not require iterators to be established. Control-plane or administrative APIs may include, for example, "createStream" (to establish a new stream), "deleteStream" (to remove an existing stream), and "describeStreams" (to view properties of specified streams). With respect to stream data analysis, "getOutlierStatus" or "getOutlierScores" APIs may be invoked to obtain information about the outlier status or score of specified sets of stream data records, while a "listOutliers" API may be used to obtain records which have been classified as outliers (e.g., based on a threshold outlier score determined by the SMAS or by the client). Other stream-oriented APIs than those shown in FIG. 1 may be employed in different embodiments. It is noted that programmatic interfaces other than APIs (e.g., web pages such as web-based consoles, graphical user interfaces and/or command-line tools) may be used in at least some embodiments.

In various embodiments, an invocation of one of the programmatic analytics interfaces 192 may signal to the SMAS that outlier detection is to be performed on a given stream whose observation records are being collected (or going to be collected) from one or more data producers 158. In response, in some embodiments the SMAS may first collect a baseline set of observation records from the specified streaming data sources. The baseline set of observation records may be used as an initial reference set or initial distribution, with respect to which the outlier status or score of a newly-arrived data record is determined. In other embodiments, outlier detection may be performed without first generating a baseline set of records.

According to one embodiment, a component of the analytics subsystem 190 may determine one or more distance thresholds and corresponding distance-based criteria to be used in outlier detection for a particular stream. For example, at least one (tau, alpha) pair may be identified for a given stream, either based on input received from the client or based on heuristics or knowledge base entries. In embodiments in which banded LSH is employed, a set of hash functions and the corresponding banding parameters (e.g., the number of bands, and the number of hash functions per band) may be selected, based for example on the distance threshold. (It is noted that in some embodiments, a single LSH function may suffice, and banding may not be required—a discussion of a simple outlier detection algorithm that relies on a single LSH function is provided below in the context of FIG. 3.)

When a new data record of the stream for which outlier detection is to be performed is encountered, hash output value(s) for that record may be generated using the set of one or more selected hash functions in the depicted embodiment. Based on the hash output values that have previously been generated for earlier-analyzed data records of the stream, a set of records with matching hash output values with respect to the new data record and the distance-based criterion may be identified. The specific steps taken to identify the matching record set may differ in various embodiments, e.g., depending on whether banding is being used or not, whether data record identifiers are being stored for the different hash buckets or min-hash signatures are being used, and so on. Details regarding the determination of the matching record set for several different variants of LSH-based outlier detection are provided below. At a high level, based on the similarity determination capabilities of LSH functions, the population of the matching record set may be used as an indication or approximation of the number of previously-analyzed records which lie within the threshold distance of the new data record. Based on the matching record set population and the total number of data records observed thus far, an outlier status or score may be determined for the new data record. The outlier status/score information may be stored at the SMAS in some embodiments, and/or displayed or otherwise programmatically provided to the client 177 on whose behalf the stream is being analyzed.

It is noted that in at least some embodiments, the LSH-based technique may be applied in real time—that is, the outlier status or score of a given data record may be determined as soon as possible after the record is submitted to or received at the SMAS. In other embodiments, the technique may be applied in batch mode to streaming data that has been collected earlier. For some streaming data sources, for example, it may be the case that the distribution of attribute values of the data records changes substantially over time, so that a record which was an outlier at time T1 may no longer be an outlier at some later time (T1+delta). In some embodiments, it may therefore be helpful to perform LSH-based outlier detection on different sub-streams of a given stream—e.g., one iteration of the analysis may be performed on records collected between 10 am and 12 noon, another iteration on records collected between 11 am and 1 pm, and so on. Real-time LSH-based analysis may be combined with batch-mode LSH-based analysis in at least some embodiments—e.g., first, the outlier status of a new data record may be determined in real-time, and later, temporal variations in the stream may be taken into account by performing one or more batch-mode LSH-based analysis iterations. In some embodiments, older data records may be de-prioritized with respect to outlier detection—e.g., an insertion timestamp or "time-to-live" (TTL) parameter may be associated with the LSH-related metadata (e.g., hash bucket entries) maintained about each data record, and the timestamp or TTL may be taken into account when determining membership in matching record sets. In one implementation, a time-decay function may be used to reduce the weight associated with older records.

Overview of Neighborhood Population-Based Outlier Designation

Figure 2:
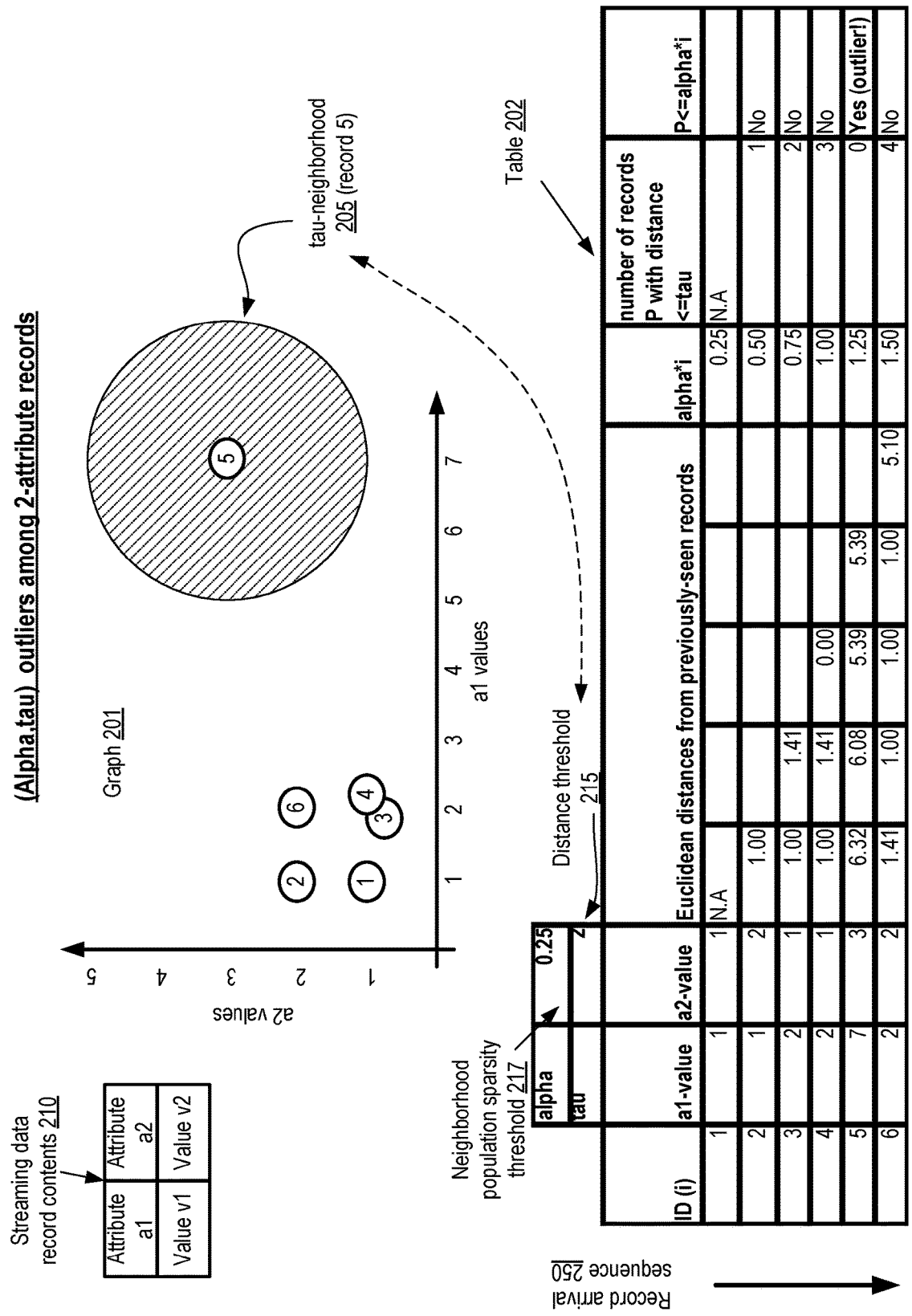
FIG. 2 illustrates an example of neighborhood-population based parameters which may be used for detecting outliers among stream data records, according to at least some embodiments.

FIG. 2 illustrates an example of neighborhood-population based parameters which may be used for detecting outliers among stream data records, according to at least some embodiments. In the depicted embodiment, each data record of a stream comprises respective integer values for two attributes a1 and a2, as shown in contents table 210. Each data record is assigned an identifier "i", with the first record being assigned identifier i=1 and i being incremented for each subsequent record as indicated by arrow 250. In table 202, information about six data records with identifiers 1 through 6 is provided. The position of the data records in the two dimensional (a1, a2) space is shown in graph 201.

In the depicted scenario, a given data record is designated as an outlier based on three quantities: alpha, tau and i. Distance threshold tau is set to 2, as shown in element 215. The neighborhood population sparsity threshold alpha is set to 0.25 or 25%. When a new data record is encountered, the number of previously-seen records that lie within a tau-neighborhood (in this case, a Euclidean distance of 2 units) of the new data record may be determined or estimated. If that number is less than one fourth (25%) of the total number of data records in the stream, the new data record is designated as an outlier.

When the first data record (i=1) is examined, by default it is not regarded as an outlier, since there are no previously-seen records with respect to which its distance can be considered. Table 210 shows the Euclidean distances for each of records 2-6 from all the previously-seen records, the quantity (alpha*i), the number of previously-seen records which are within a distance of tau units, and whether the record meets the (alpha, tau) outlier designation criterion. When record 2 arrives, its distance to the previous record is 1, and (alpha*i) is 0.5, so record 2 is not an outlier. Similarly, neither record 3 nor record 4 are outliers, based on their tau-neighborhood populations and the changing (alpha*i) threshold. However, the distances of record 5 from earlier-seen records are {6.32, 6.08, 5.39 and 5.39}, so the number of neighbors of record 5 within a distance of 2 units is 0. At this point, (alpha*i) is (0.25*5) or 1.25, so record 5 does meet the criterion for being designated as an outlier, as shown in table 210. The designation of record 5 as an outlier is intuitively apparent in graph 201, in which the tau-neighborhood 205 (a circle of radius tau centered at data record 5) is shown to be empty. Record 6 is also not an outlier based on the (alpha, tau) criterion in use.

For high-volume streams, which may comprise millions or billions of data records, each of which may comprise dozens or hundreds of attributes, computing the distance metrics between each new record and all the earlier-seen records may quickly become impractical. Consequently, a brute-force approach similar to that shown in FIG. 2 may not scale. Instead, any of several techniques based on locality sensitive hashing (LSH) may be employed in various embodiments as discussed in detail below.

Simple LSH Algorithm

Figure 3:
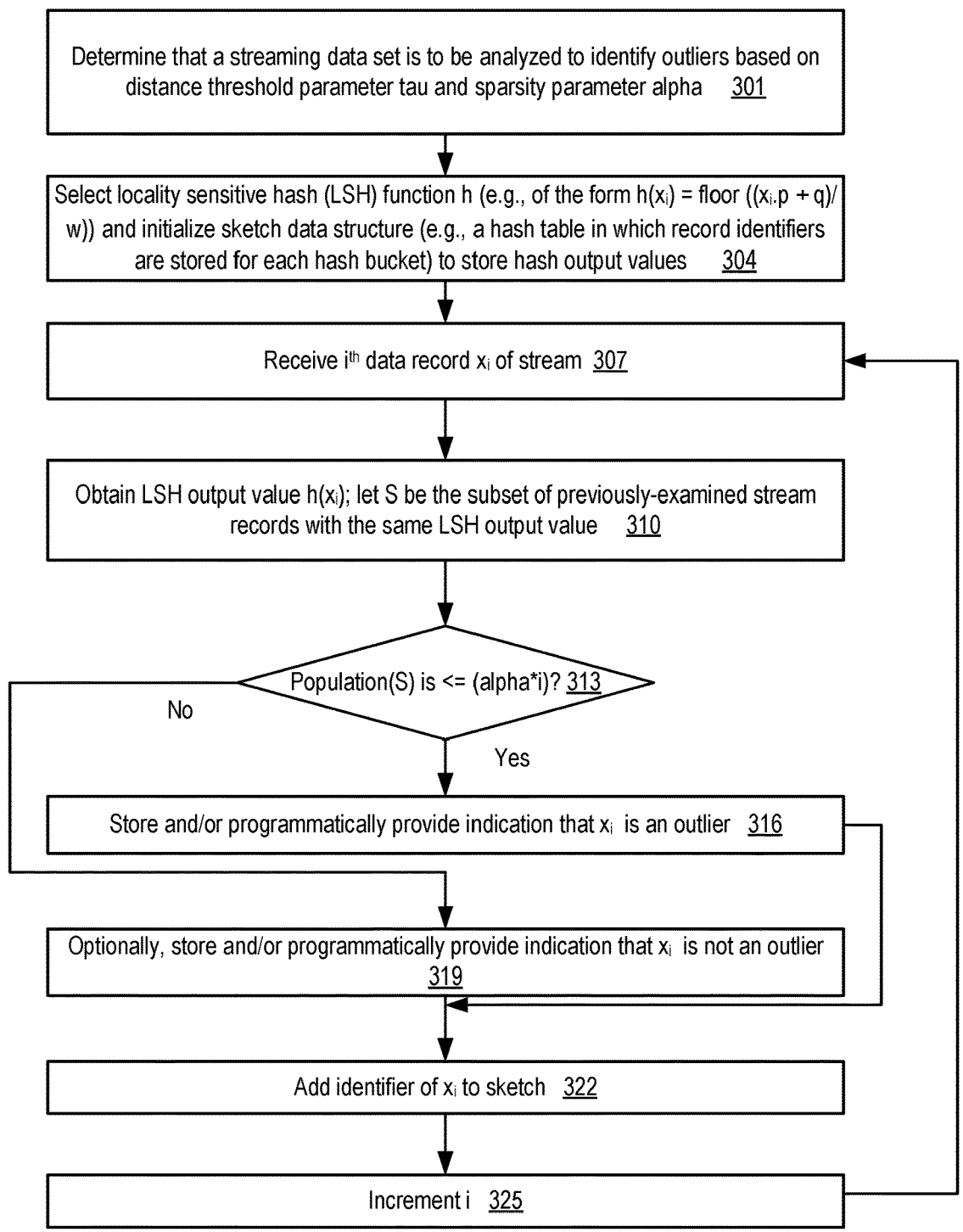
FIG. 3 is a flow diagram illustrating aspects of operations that may be performed to implement a simple locality sensitive hashing based algorithm for detecting stream outliers, according to at least some embodiments.

FIG. 3 is a flow diagram illustrating aspects of operations that may be performed to implement a simple locality sensitive-hashing based algorithm for detecting stream outliers, according to at least some embodiments. As shown in element 301, a determination may be made that a data stream is to be analyzed to identify outlying data records based on a distance threshold parameter tau and a sparsity parameter alpha. A single locality sensitive hash function may be selected for outlier detection in the depicted embodiment (element 304). The selected LSH function may be of the form $$h(x_i) = \text{floor}((x_i \cdot p + q)/w) \quad \text{//LSH function definition FD1}$$

where $x_i$ is a stream data record with k numeric attributes, and p, q and w are parameters. In particular, in at least some embodiments, p may be a k-dimensional random vector drawn from a Gaussian N(0,1), w may be a positive integer, and q may be a random value selected from the range [0,w]. In some embodiments, w may be selected based at least in part on tau, the distance threshold being used for the stream. In at least one embodiment, a different locality sensitive hash function, which may not necessarily take the form shown in definition FD1, may be employed. A sketch or summary data structure representing the results of the hash function may be initialized, such as a straightforward hash table in which, for each hash bucket representing a distinct value to which one or more data records are mapped, the identifiers of the mapped data records are stored.

The $i^{th}$ data record $x_i$ of the stream may be received at the outlier detector tool or service (element 307). The selected LSH function may be applied to the data record (element 310). Let S be the subset of previously-examined data records of the stream which were mapped to the same hash output value or bucket as $x_i$ (S may also be termed the matching record set for $x_i$). The population or count of such a set S may be determined. If the count is less than or equal to alpha*i, as determined in element 313, $x_i$ may be designated as an outlier in the depicted embodiment; otherwise, $x_i$ may not be designated as an outlier. If is identified as an outlier, an indication of this decision may be stored and/or provided programmatically (e.g., to a client on whose behalf the outlier analysis is being performed) (element 316) in the depicted embodiment. In some embodiments, the status indication may optionally be stored and/or programmatically provided even if $x_i$ is identified as an inlier (i.e., not an outlier) (element 319). The identifier of $x_i$ may be added to the sketch (e.g., to the hash bucket corresponding to $h(x_i)$) (element 322). The index i may be incremented for the next data record (element 325), and the operations corresponding to elements 307 onwards may be repeated.

While the straightforward single-LSH-function approach shown in FIG. 3 may work well for some data streams, it may not work as well for others. As discussed below in the context of FIG. 4, the number of false positives (records incorrectly included as members of the tau-neighborhood of $x_i$) and false negatives (records incorrectly excluded from the tau-neighborhood of $x_i$) may sometimes be substantial. In addition, as suggested in element 322 of FIG. 3, the size of the sketch (the number of record identifiers retained) may keep growing as more stream records arrive, which may not be optimal. Approaches to resolve both these concerns (e.g., the use of banded LSH for reducing false negatives and false positives, and the use of min-hash signatures to constrain sketch size growth) are described below.

FIG. 4 illustrates examples of actual and ideal matching-hash-output probability graphs as a function of inter-record distances, according to at least some embodiments. If a single locality sensitive hash function 402 is used for outlier detection using the approach outlined in FIG. 3, a curve similar to curve ABC of graph 410 may be obtained when the probability of matching hash outputs is plotted with respect to inter-record distance. It is noted that graph 410 is intended primarily to show the general relationship between the probability and the distance, and may not necessarily represent any specific set of hash function parameters or any particular data set. In graph 410, the Y-axis represents the probability that the output values produced by the single LSH function 402 for two different data points $x_i$ and $x_j$ are identical (i.e., prob($h(x_i) = h(x_j)$)), while the X axis shows the distance between $x_i$ and $x_j$. When the distance is small, the probability of matching hash output values is high (with the probability approaching one as distances approach zero), and as the distance increases, the probability of matching hash output values is low.

The vertical line DBK corresponds to the distance threshold tau in graph 410. As such, because of the shape of curve ABC, some data records which lie within the tau-neighborhood of each other may not have the same hash function output values. Such data records, which may be considered false negatives with respect to tau-neighborhood-membership detection using the single LSH approach, may correspond to region AKB of graph 410. Furthermore, some other pairs of points may have identical hash output values while being separated by distances greater than tau. These points correspond to region BCD of graph 410, and may be considered false positives with respect to tau-neighborhood-membership detection. Region AZD corresponds to the true positives—data records that lie within the tau neighborhood, and also have matching hash output values.

The number of data record pairs which correspond to the union of regions BCD and AKB (which represents incorrect conclusions about tau-neighborhood-membership) may be significant for some combinations of data sets and hash functions. Ideally, a graph of the matching-hash-output probability curve versus actual inter-record distance should look similar to graph 412. In ideal graph 412, there are no false positives and no false negatives. For all record pairs which lie within a distance tau of each other, the hash output values match; and for any record pairs whose distance exceeds tau, the hash output values differ. While the ideal step-function shape of curve AKDC of graph 412 may be difficult to achieve, the use of banded LSH functions in various embodiments may help move the curve towards the ideal shape as indicated by arrow 499 and discussed below.

Banded LSH Techniques

Figure 5:
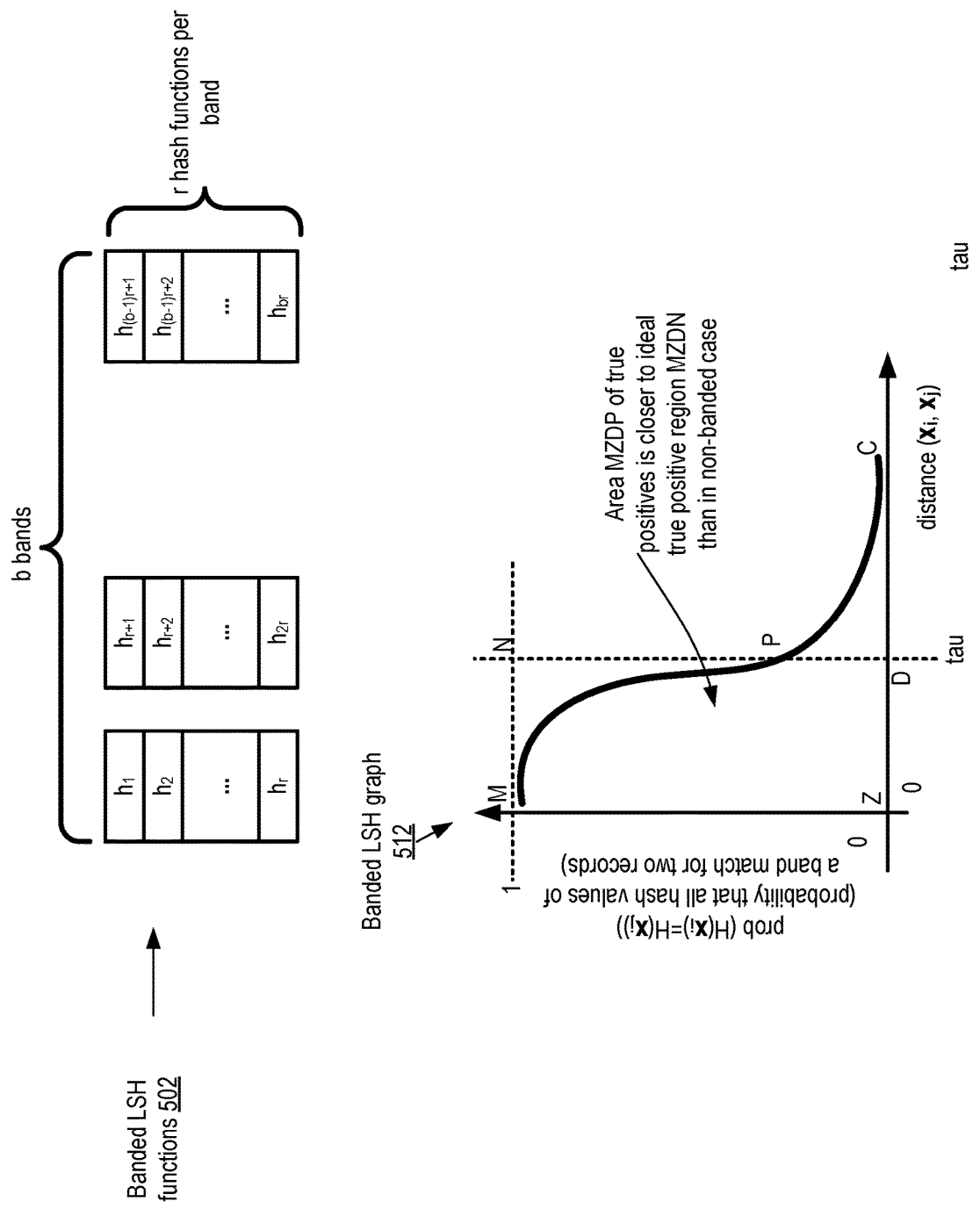
FIG. 5 illustrates a high-level overview of the use of banded locality sensitive hashing to reduce false positives and false negatives with respect to outlier detection within data streams, according to at least some embodiments.

Instead of using a single LSH function, in some embodiments multiple independent LSH functions grouped in bands may be used. FIG. 5 illustrates a high-level overview of the use of banded locality sensitive hashing to reduce false positives and false negatives with respect to outlier detection within data streams, according to at least some embodiments. In the depicted embodiment, a total of b*r hash functions 502 are used, grouped into b bands of r HSL functions each. In at least some embodiments, the individual LSH functions may each be of the form discussed above with respect to definition FD1.

At a high level, a two-stage search for matching hash-output data records may be conducted for any given stream data record $x_i$ in the banded-LSH approach. When the data record is encountered by the outlier detection tool or service, all b*r output values may be computed. Then, within each band, the set of previously-examined data records which are mapped to the identical hash buckets (for all r functions of that band) as $x_i$ is identified. In effect, this step may comprise computing the intersection of the matching record sets for $x_i$ for each of the r hash functions of the band. If b different independently-calculated hash output values match for two records $x_i$ and $x_j$, and the probability of any given hash function's output matching for the two is inversely proportional to the distance between the data records, intuitively the two data records are likely to be closer to each other than if only a single hash function's output values matched for the two.

For a pair of data records $x_i$ and $x_j$, their band hash values H may be said to match (i.e., $H(x_i)=H(x_j)$) if and only if all their hash values h match in one of the bands. The probability of the band hash values matching may be obtained by the following:

$$\text{prob}(H(x_i)=H(x_j))=1-(1-(\text{prob}[h_i(x_i)]=h_i(x_j)])^r)^b \quad \text{E1:}$$

In equation E1, the quantity raised to the $r^{th}$ power is the probability that all r hash output values of any one band match for two data records, and the quantity raised to the $b^{th}$ power is the probability that such matches do not occur in at least one band of the b bands. The curve MPC of graph 512 plots $\text{prob}(H(x_i)=H(x_j))$ as a function of inter-record distance. As in the case of graph 410, graph 512 is intended to illustrate general trends and may not necessarily represent any particular set of banded LSH functions or any particular data set. Examining graphs 512 and 410, it may become apparent that the use of banded LSH functions tends to reduce the relative number of errors (false positives and/or false negatives) as compared to the non-banded or single-LSH approach. For example, the region MZDP of graph 512 is closer to the ideal true positive curve MZDN than the corresponding region AZDB of graph 410 was to the ideal true positive curve AZDK of graph 410. Since the errors with respect to neighborhood-membership detection are reduced as a result of using banded LSH, the accuracy of detecting outliers may be expected to improve. The values of b (the number of bands) and r (the number of LSH functions per band) may be selected based at least in part on the distance threshold tau in various embodiments. For example, if $p_{tau}$ is the probability that $h(x_i)=h(x_j)$ for data records at distance tau, in one embodiment b and r may be chosen using the following equation:

$$p_{tau}=(1/b)^{1/r} \quad \text{E2:}$$

Pseudo-code for a banded LSH-based algorithm which may be employed for detecting outliers among data stream records in various embodiments is provided below.

Figure 6:
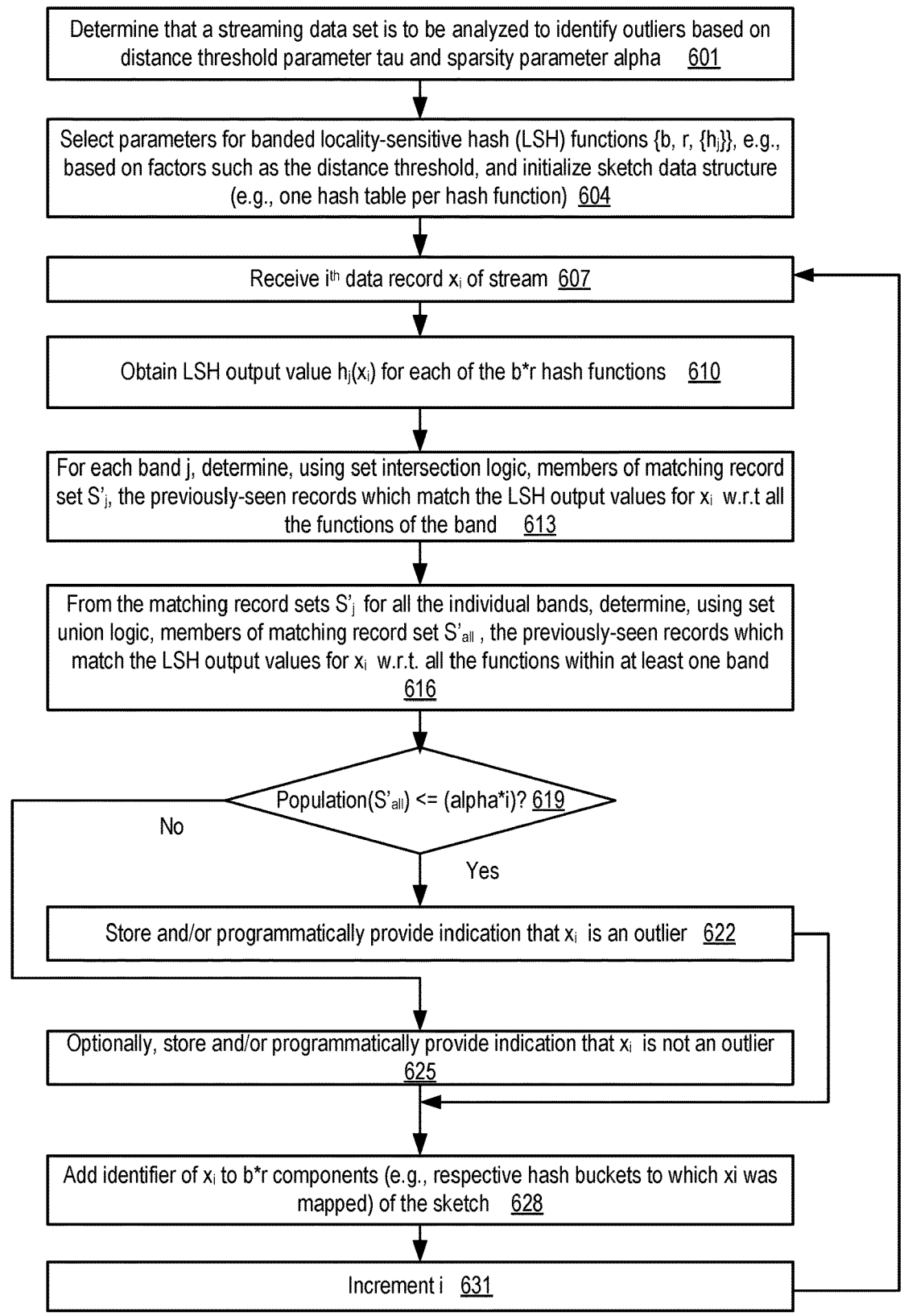
FIG. 6 is a flow diagram illustrating aspects of operations that may be performed to implement a banded locality sensitive hashing algorithm to identify outliers within a data stream, according to at least some embodiments.

//Start of pseudo-code for detecting outlier using b bands of r LSH functions IsOutlier(S, $x_i$, alpha)
// S is a sketch (e.g., hash buckets with identifiers of corresponding data records) representing previously-seen data records of the stream, alpha is the population fraction parameter
// values of b and r (and per-hash function parameters p, q and w) are assumed to have been selected
// compute all the hash values using the b*r functions
1. Compute $h_1(x_i), h_2(x_i), \ldots, h_{b*r}(x_i)$,
2. Let Sj be the bucket in S corresponding to $h_j(x_i)$
// compute matching record sets per band using set intersections
3. For j=1 to b do
4. $S'_j = S_{(j-1)r+1} \cap S_{(j-1)r+2} \cap \ldots \cap S_{jr}$
5. } end for
// compute overall matching record set across all bands using set unions
6. $S_{all} = \cup_j S'_j$
//if the population of the overall matching record set is less than the alpha-based fraction of the stream, $x_i$ is designated as an outlier
7. if $\text{pop}(S_{all}) \leq \text{alpha}*i$ then
8. outlierStatus=true // $x_i$ is an outlier
9. else
10. outlierStatus=false // $x_i$ is not an outlier
11. endif
12. add $x_i$ to the hash buckets of S to which it is mapped
13. return outlierStatus
//End of pseudo-code for detecting outlier using b bands of r LSH functions FIG. 6 is a flow diagram illustrating aspects of operations that may be performed to implement a banded locality sensitive hashing algorithm to identify outliers within a data stream, according to at least some embodiments. As shown in element 601, a determination may be made that a data stream is to be analyzed to identify outliers on the basis of a criterion which involves a distance threshold parameter tau and a neighborhood population sparsity parameter alpha. A plurality of locality sensitive hash functions, grouped into b bands of r hash functions each, may be identified for the outlier detection. In at least some embodiments, some or all of the hash functions may have the general form indicated in function definition FD1 discussed above. The parameters associated with the hash functions (including b, r, as well as the per-function parameters (p, q and w)) may be selected (element 604), e.g., based on the distance threshold and/or other considerations such as parameters specified in client requests, the computational capacity available for the outlier detection, etc. For example, if the outlier detector is part of a stream management and analytics service or a machine learning service with an abundance of powerful execution platforms available, a larger total number of hash functions may be used than if the outlier detection is being performed on a relatively low-power client-side device. A sketch data structure may be initialized to hold the results of the hashing on the data records of the stream—for example, b*r hash tables may be created, with each hash table eventually comprising a plurality of buckets corresponding to the hash values generated by applying a particular LSH function on various data records. The identifiers of the data records which are mapped to a particular bucket may be stored in the sketch. It is noted that the hash bucket entries may only be created when needed, i.e., a bucket entry for the LSH function $h_j$ and the hash value v may only be created after the first data record which is mapped to v is processed.

When a new data record $x_i$ of the data stream is received or becomes available for analysis (element 607), operations similar to those indicated in the isOutlier algorithm for which pseudo-code was indicated above may then be implemented for the data record. The hash output values corresponding to all the b*r hash functions may be computed (element 610), as indicated in line 1 of the pseudo-code. For each band j, a matching record set $S'_j$ of the previously-seen records which match the LSH output values for $x_i$ for all the functions of the band may be determined using set intersection logic (element 613), as indicated in lines 2-5 of the pseudo-code.

From the per-band matching record sets, an overall matching record set $S'_{all}$ may be identified using set union logic in the depicted embodiment, comprising records which match $x_i$'s hash output values in at least one band (element 616), as indicated in line 6 of the pseudo-code. As per line 7 of the pseudo-code, the population or count of the overall matching record set $S'_{all}$ may be computed and compared to the quantity (alpha*i) (element 619). If the population is less than or equal to (alpha*i) in the depicted embodiment, $x_i$ may be designated as an outlier (element 622 and line 8 of the pseudo-code), otherwise, $x_i$ may be designated as an inlier or non-outlier (element 625 and line 10 of the pseudo-code). The outlier status of $x_i$ may be stored and/or programmatically provided to a client on whose behalf the stream is being analyzed, or to other interested parties. The sketch may be updated based on $x_i$ (element 628 and line 12 of the pseudo-code)—e.g., by adding $x_i$'s record identifier to each of the b*r hash buckets to which $x_i$ was mapped. The operations corresponding to elements 607 onwards may be repeated for the next data record of the stream (with the index i being incremented as shown in element 631).

FIG. 7 illustrates a simple example of identifying outliers in a one-dimensional data set using banded locality sensitive hashing, according to at least some embodiments. The simple example has been chosen to explain the concepts involved in the algorithm; in practice, the streams for which the banded LSH-based algorithm is applied may comprise data records with, for example, dozens or hundreds of attributes.

The parameters 702 selected for the algorithm (at least some of which may have been selected based on some specific distance threshold which is not shown) include four hash functions $h_1$-$h_4$ with the general formula 704. The banding parameters b and r are each set to 2, so there are two bands of two hash functions each. Band $b_1$ contains $h_1$ and $h_2$, and band $b_2$ contains $h_3$ and $h_4$. Alpha is set to 0.25. The parameter w is set to 4 for all the hash functions. The randomly-selected values for p and q for each hash function are as shown in parameter set 702—e.g., for $h_1$, p=0.5 and q=1.

At a point of time corresponding to FIG. 7, four one-dimensional data records $x_1$-$x_4$ with respective integer values 4, 2, 3 and 6, have already been received and processed using the banded LSH functions, and a new data record $x_5$ is to be examined to determine whether it is an outlier. Table 708 shows the integer attribute values and LSH output values that were obtained for the four earlier-received records—for example, $x_1$ was mapped to 0, 0, 1 and 1 respectively by $h_1$-$h_4$, while $x_4$ was also mapped to 1, 0, 1 and 1.

The output values obtained for $x_5$ (whose integer attribute value is 9) from the four hash functions are shown in table 710. Outlier analysis detection details with respect to $x_5$ (corresponding to various calculations performed according to the isOutlier pseudo-code) are shown in table 715. The sets of earlier-processed data records which match the hash output values of $x_5$ are indicated as $S_1$ (for hash function $h_1$), $S_2$ (for $h_2$), etc. Thus, $x_5$ was mapped to 1 by $h_1$, and the only record among $x_1$-$x_4$ that was also mapped to 1 by $h_1$ is $x_4$, so $S_1$ is set to $\{x_4\}$. With respect to $h_2$, all four earlier-seen records had the same output value as $x_5$, so $S_2$ is set to $\{x_1, x_2, x_3, x_4\}$, and so on.

For each band, the band-level matching record set with respect to $x_5$ is computed using the intersections of the corresponding per-hash-function matching record sets. For band $b_1$, the matching record set $S'_1$ i is $\{x_4\}$ (the intersection of $S_1$ and $S_2$), while for band $b_2$, the matching record set $S'_2$ is the null set (the intersection of $S_3$ and $S_4$). The union of the band-level matching record sets $S'_{all}$ is also $\{x_4\}$, and the population of $S'_{all}$ is therefore 1. Since this population is less than (alpha*i), $x_5$ is designated as an outlier.

Space-Efficient Sketches Using Min-Hash Signatures

In the versions of the single-LSH-based and banded-LSH-based techniques described above (in the contexts of FIG. 3 and FIG. 6, for example), the sketches used to store the hashing results may grow in size as more and more stream data records are received and processed. For high-volume streams in which for example thousands of records are received per second, this may result in substantial storage requirements over time. In an alternative space-efficient version of the banded-LSH-based algorithm, instead of retaining separate pieces of information about each of the data records which is mapped to a given hash bucket (such as the record's identifier) via any of the LSH functions, a fixed-size signature obtained using an additional set of hash functions is retained for each hash bucket.

In effect, a fixed-size min-hash signature for a given hash bucket (e.g., a signature comprising q values obtained using q additional hash functions which are not among the b*r banded-LSH functions) may represent an approximation of the set of data records which are mapped to that hash bucket, rather than the exact set of data records which are mapped to that hash bucket. Let $g_1, g_2, \ldots, g_u$ be u hash functions to be used for the bucket signatures, each of which maps a given data record into positive integers within a bounded range. Then the signature $sig_b$ for bucket b may be obtained as the u-dimensional vector $[v_1, v_2, \ldots, v_u]$ where $v_i = \min(g_i(x_j))$ for all $x_j$ that were mapped to bucket b. That is, the $i^{th}$ element of the signature is the minimum hash value produced using the $i^{th}$ of the u hash functions for any of the data records mapped to the bucket. (The term "min-hash" signature is used because the signature is derived from the minimum among the hash values of the set of mapped data records.)

Instead of performing the set intersection and union operations discussed above (e.g., with respect to elements 613 and 616 of FIG. 6) on actual sets of data record identifiers, approximate signatures corresponding to the set intersections and set unions may be obtained in the space-efficient technique. It can be shown that the probability of two corresponding signature elements matching in respective min-hash signatures $sig_1$ and $sig_2$ for two sets $S_1$ and $S_2$ (corresponding to respective hash buckets) is proportional to the ratio of the size of the intersection of the sets to the size of the union of the sets:

$$\text{Prob}(sig_1[i]=sig_2[i])=\text{population}(S_1 \cap S_2)/\text{population}(S_1 \cup S_2) \quad \text{E3:}$$

If the populations of $S_1$ and $S_2$ and $N_1$ and $N_2$ respectively, and there are m matches out of the u min-hash signature elements of $S_1$ and $S_2$, the following approximation equation can be derived for the population of the intersection:

$$\text{population}(S_1 \cap S_2) \sim = (m/u)*(N_1+N_2)/((m/u)+1) \quad \text{E4:}$$

An approximate signature $sig_{int}$ for the intersection of the two sets can be obtained from their individual signatures $sig_1$ and $sig_2$ as follows. If $sig_1[i]=sig_2[i]$, $sig_{int}[i]$ is set equal to $sig_1[i]$; otherwise, $sig_{int}[i]$ is set to an invalidity indicator such as the token "invalid" or a special integer "−1". The reason for generating invalid signature values is that for elements where the signature values differ, one or both of the signature values is due to a record not in $(S_1 \cap S_2)$, and so it may be difficult to determine the minimum hash value for records in $(S_1 \cap S_2)$ from just the signature values in $sig_1$ and $sig_2$.

With respect to the union of two sets $S_1$ and $S_2$, the following approximation can be used:

$$\text{population}(S_1 \cup S_2) \sim = (N_1+N_2)/((m/u)+1) \quad \text{E5:}$$

An approximate signature $sig_{uni}$ for the union of the two sets can be obtained from their individual signatures $sig_1$ and $sig_2$ as follows. If both $sig_1[i]$ and $sig_2[i]$ are valid, $sig_{uni}[i]$ is set equal to the minimum among $sig_1[i]$ and $sig_2[i]$; otherwise (if either $sig_1[i]$ or $sig_2[i]$ is invalid, or both are invalid), $sig_{uni}[i]$ is also set to an invalidity indicator.

Using the approximate min-hash signature generation techniques for set unions and set intersections (together equations E4 and E5), approximate versions of the operations corresponding to elements 613 and 616 of FIG. 6 may be performed without storing all the data records' identifiers for the various hash buckets. The population of the overall matching record set for any given $x_i$ may thereby be approximated in various embodiments, and the outlier status of $x_i$ may be determined in a much more space-efficient manner than if all the identifiers were stored. Assuming that an adequate set of q min-hash generation functions is used, the errors in the approximations may be within acceptable limits in various embodiments.

FIG. 8 is a flow diagram illustrating aspects of operations that may be performed to implement a space-efficient algorithm relying on min-hash signatures and banded locality sensitive hashing to identify outliers within a data stream, according to at least some embodiments. As shown in element 801, a determination may be made that a data stream is to be analyzed to identify outliers on the basis of a criterion which involves a distance threshold parameter tau and a neighborhood population sparsity parameter alpha. Parameters for a space-efficient LSH-based algorithm for outlier detection for the stream may be selected (element 804). For example, a plurality of locality sensitive hash functions grouped into b bands of r hash functions each may be identified, and u hash functions to be used for min-hash signatures may also be identified. In at least some embodiments, some or all of the functions used for banded-LSH may have the general form indicated in function definition FD1 discussed above. At least some of the parameters may be selected based on the distance threshold and/or other considerations such as the computational capacity available for the outlier detection or client-specified preferences. A sketch which is to comprise respective signature vectors of length u for each hash bucket (as well as a population count for each bucket) may be initialized. It is noted that the hash bucket entries may only be created when needed, i.e., a bucket entry or signature for the LSH function $h_j$ and the hash value v may not actually be created until the first data record which is mapped to v by $h_j$ is encountered; from that point forward, the signature and the population of the hash bucket may be tracked.

When the $i^{th}$ data record $x_i$ of the stream is received or becomes available for processing (element 807), the b*r banded LSH output values for $x_i$ may be calculated, and the u signature hash values may also be calculated (element 810). Then, for each band, the approximate signature for the matching record set $S'_j$ (and the corresponding approximate population) of $x_i$ for that band may be determined using the approach outlined above for set intersection operations using signatures (e.g., equation E4 may be used for the population, and $sig_{int}$ may be approximated as discussed) (element 813). The logic described above with respect to approximating set union signatures and set union populations may then be applied to determine the approximate population of $S'_{all}$ (element 816) from the per-band signatures and populations. The approximate population of $S'_{all}$ may then be compared to (alpha*i) (element 819) to determine whether $x_i$ should be designated as an outlier (element 822) or not (element 825). The outlier status of $x_i$ may be stored and/or programmatically indicated. The min-hash signatures of the b*r buckets to which $x_i$ was mapped may be updated if needed (e.g., if the mapping for $x_i$ changes the minimum for any element of any of the buckets) (element 828). The index I may be incremented (element 831) and the operations corresponding to elements 807 onwards may be repeated for the next data record of the stream.

FIG. 9 illustrates examples of min-hash signatures which may be generated for hash buckets corresponding to locality sensitive hash function outputs, according to at least some embodiments. Table 902 illustrates the same banded-LSH hash value outputs that were obtained for single-integer-attribute records $x_1$-$x_5$ in the context of FIG. 7, as well as the output values produced by two additional hash functions $g_1$ and $g_2$ which are used for the min-hash signatures. The remaining parameters alpha, b, r, w, etc. are assumed to be the same in the example of FIG. 9 as in FIG. 7.

When the first record $x_i$ is processed, the LSH output values produced by $h_1$-$h_4$ are 0, 0, 1 and 1 respectively, and the values to which $x_1$ is mapped by $g_1$ and $g_2$ are 21 and 9, as shown in the first row of table 902. As indicated in bucket state 910A, respective bucket entries for each of these four values are added to the sketch; each entry indicates the current population N of the bucket (which is 1, since a single data record has been encountered for each bucket at this stage), and the signature (21, 9) corresponding to $x_1$. When $x_1$ is processed, its banded LSH output values are also 0, 0, 0 and 1, and its signature-generating hash values are 7 and 23. All the LSH band output values for $x_1$ and $x_2$ match, so the number of hash buckets remains unchanged in state 910B, and the population counts of each of the buckets is incremented by 1. However, the min-hash signatures are modified for each of the buckets (since 7, the $g_1$ output value corresponding to $x_2$, is lower than 21, which was the original minimum value for element 1 of the signature)—the original signatures (21, 9) are therefore replaced by the signatures (7, 9). Similarly, bucket state 910C indicates the changes made to the buckets after $x_3$ is processed.

When $x_4$ is processed, a new bucket corresponding to the combination $h_1(x)=1$ is created as shown in bucket state 910D, since that value of $h_1(x)$ had not been encountered before. The signatures used when determining $x_5$'s outlier status are those indicated in state 910D: for example, the $S_1$ signature corresponding to $h_1$ is (3, 18), the $S_2$ signature corresponding to $h_2$ is (3, 9), the signature $S_3$ corresponding to $h_3$ is (–, –) (because no previously-seen record has the $h_3$ output value of 2), and the signature $S_4$ corresponding to $h_4$ is (3, 9). These bucket signatures and the corresponding populations may be used to determine $x_5$'s outlier status using the signature-based techniques discussed above: for example, the approximate signature for $S'_1$ (the band-level matching record set for band 1 comprising $h_1$ and $h_2$) would be (3, "INV") where "INV" is the invalidity indicator or invalidity token. The population count for $S'_1$ would be obtained as (5/3) using equation E4. The approximate signature for $S'_2$ would be ("INV", "INV"), with an approximate population of 0. Finally, the approximate signature for $S'_{all}$, derived from $S'_1$ and $S'_2$ using the signature-based set union calculation technique, would also be ("INV", "INV"). The approximate population of $S'_{all}$ would be zero (based on equation E5), and $x_5$ would again be designated as an outlier (just as it was in FIG. 7). After $x_5$ is processed, a new bucket corresponding to $h_3(x)=2$ is created, as shown in bucket state 910E.

In general, the amount of storage required for any given bucket may remain fixed in the min-hash signature-based algorithm, regardless of the number of data stream records encountered. As discussed above in the context of $x_5$, the approximate signatures of the band-level matching record sets $S'_j$ for any $x_i$ may be obtained from the signatures of the individual buckets using the set-intersection determination techniques indicated earlier. The approximate signatures and population of the overall matching record set $S'_{all}$ may be obtained from the band-level matching record set signatures by using the signature-based set-union determination techniques to determine whether any given $x_i$ is an outlier or not, without having to store the identifiers of all the data records encountered. Of course, when using min-hashing in the way described above, some information may be lost because of the approximations involved (e.g., when some signature entries are replaced by invalidity indicators as discussed above). This loss of information may represent the tradeoff between accuracy of the results and the space saved by using signatures, and may typically be kept within reasonable limits in various embodiments by using an appropriate set of signature generation hash functions.

Determining Outlier Scores Using Multiple Distance Thresholds

In several of the approaches towards outlier detection described above, e.g., in the context of FIG. 3, FIG. 6 and FIG. 8, a specific distance threshold tau may be assumed to be known before the stream is analyzed. In some cases, as also discussed earlier, such a distance threshold may be indicated by a client on whose behalf the stream is being analyzed. However, clients may not always be able (or willing) to provide such a distance threshold, especially in situations in which the data records have a large number of attributes (in which intuitive interpretations of the meanings of distance metrics may not be straightforward). The banded-LSH based techniques discussed above may be generalized in some embodiments to relax the requirement for a selection of a particular distance threshold. In one such approach, instead of determining a binary result as to whether a given data record is an (alpha, tau) outlier or not, an outlier score which is not tied to any particular tau distance threshold may be obtained for each data record, and the records may then be ranked using the outlier scores (e.g., with the N highest-ranking data records encountered thus far being designated as outliers, where N may be selected by the client or by the outlier detector). In one such embodiment, the outlier score $OS(x_i)$ for a given data record $x_i$ may be defined as the distance between $x_i$ and its $(alpha*i)^{th}$ closest neighbor among the other data records encountered thus far.

Figure 10:
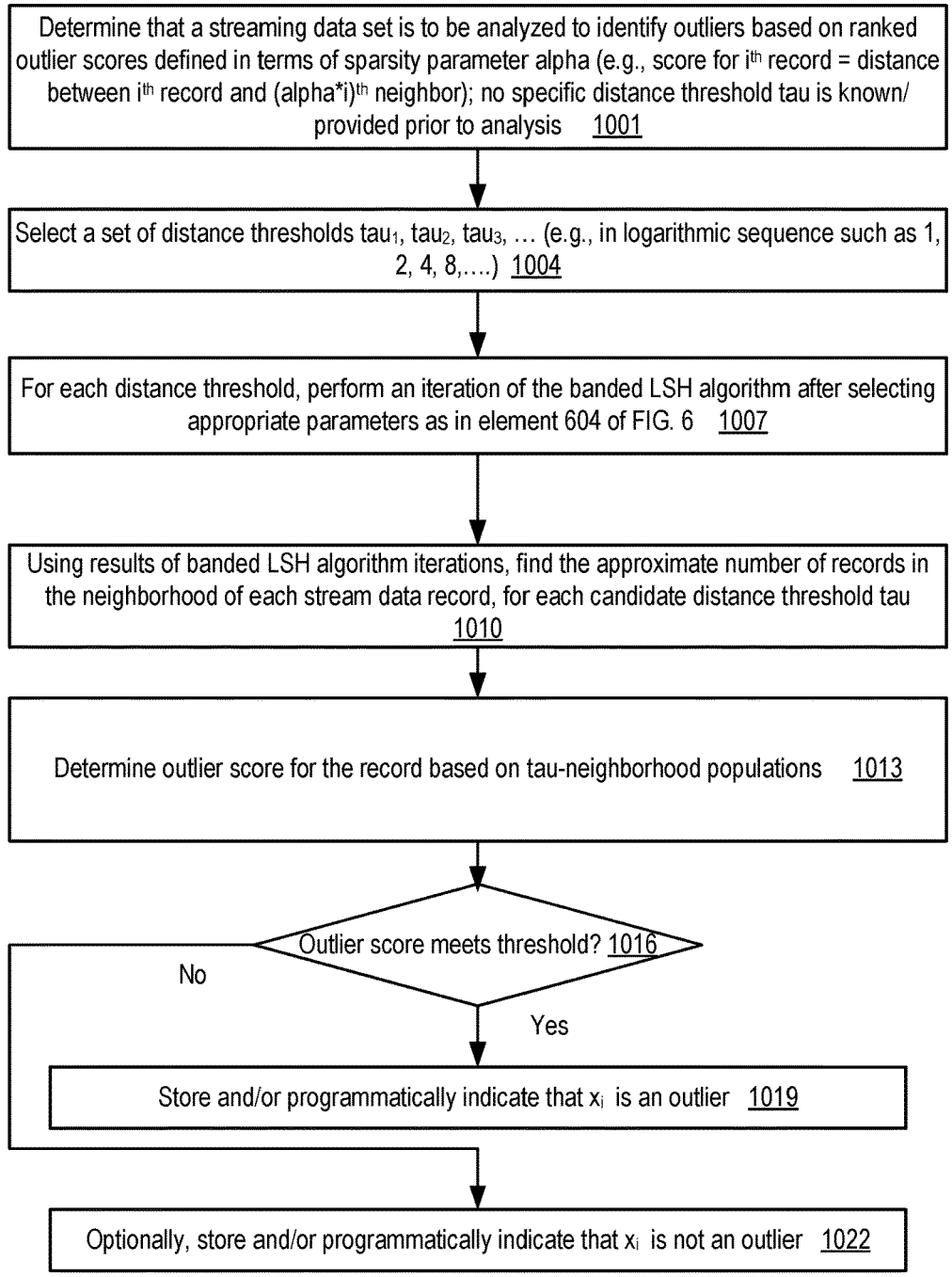
FIG. 10 is a flow diagram illustrating aspects of operations that may be performed to perform outlier detection on a stream using multiple detector-selected distance thresholds, according to at least some embodiments.

FIG. 10 is a flow diagram illustrating aspects of operations that may be performed to perform outlier detection on a stream using multiple detector-selected distance thresholds, according to at least some embodiments. As shown in element 1001, a determination may be made that a data stream is to be analyzed to identify outliers on the basis of a criterion which is based at least in part on a neighborhood population sparsity parameter alpha but is not tied to any specific pre-specified distance threshold. Respective outlier scores $OS(x_i)$ based on the definition discussed above may be assigned in the depicted embodiment to individual data records $x_i$.

A set of distance threshold ($tau_1$, $tau_2$, $tau_3$, ... ) may be selected, e.g., in a logarithmic sequence such as 1, 2, 4, 8, 16, ... or 1, 3, 9, 27, ... (element 1004). The particular threshold values and/or the number of thresholds to use may be selected, for example, based on heuristics, based on a preliminary examination of some subset of the stream data records, the availability of computational resources, etc. For each distance threshold, a set of parameters for LSH-based (alpha, tau) outlier analysis similar to those discussed in the context of element 604 of FIG. 6 may be selected, and the corresponding outlier detection analysis using the approach similar to that discussed in FIG. 6 may be performed for the distance threshold (element 1007).

Using the results of a given iteration, an approximate number of records in the tau-neighborhood for one of the tau thresholds may be found (element 1010). Thus, in one example, the approximate neighbor count for a particular distance threshold tau may be 7, the approximate neighbor count for double the distance threshold (2*tau) may be 20, and the approximate count for distance threshold (4*tau) may be 50. Using the approximate neighborhood counts for various distance thresholds, the outlier score $OS(x_i)$ may be determined (element 1013). For example, assume that $N_{tau}(x_i)$ represents the approximate population of the tau-neighborhood of $x_i$. If tau' is the largest distance threshold such that $N_{tau'}(x_i)<=(alpha*i)<=N_{2*tau'}(x_i)$, in one embodiment the distance of the $(alpha*i)^{th}$ closest neighbor of $x_i$ may conservatively be approximated as 2*tau', and the outlier score 2*tau' may therefore be assigned to $x_i$. Since the distance of the $(alpha*i)^{th}$ closest neighbor is at least tau' and at most 2*tau' in this example, the distance estimate 2*tau' is within a factor of two of the correct (estimated) distance.

If the outlier score meets a threshold (e.g., if it lies within the top N outlier scores seen thus far), as determined in element 1016, $x_i$ may be designated as an outlier. The result (e.g., the outlier score itself, the ranking of the score relative to other data records, or the threshold-based determination as to whether $x_i$ is an outlier or not) may be stored and/or programmatically indicated in the depicted embodiment (elements 1019 and 1022).

It is noted that in various embodiments, at least some operations other than those illustrated in the flow diagrams of FIG. 3, FIG. 6, FIG. 8 and FIG. 10 may be used to implement the outlier detection techniques described above. Some of the operations shown may not be implemented in some embodiments or may be implemented in a different order, or in parallel rather than sequentially.

Machine Learning Service Environment

Figure 11:
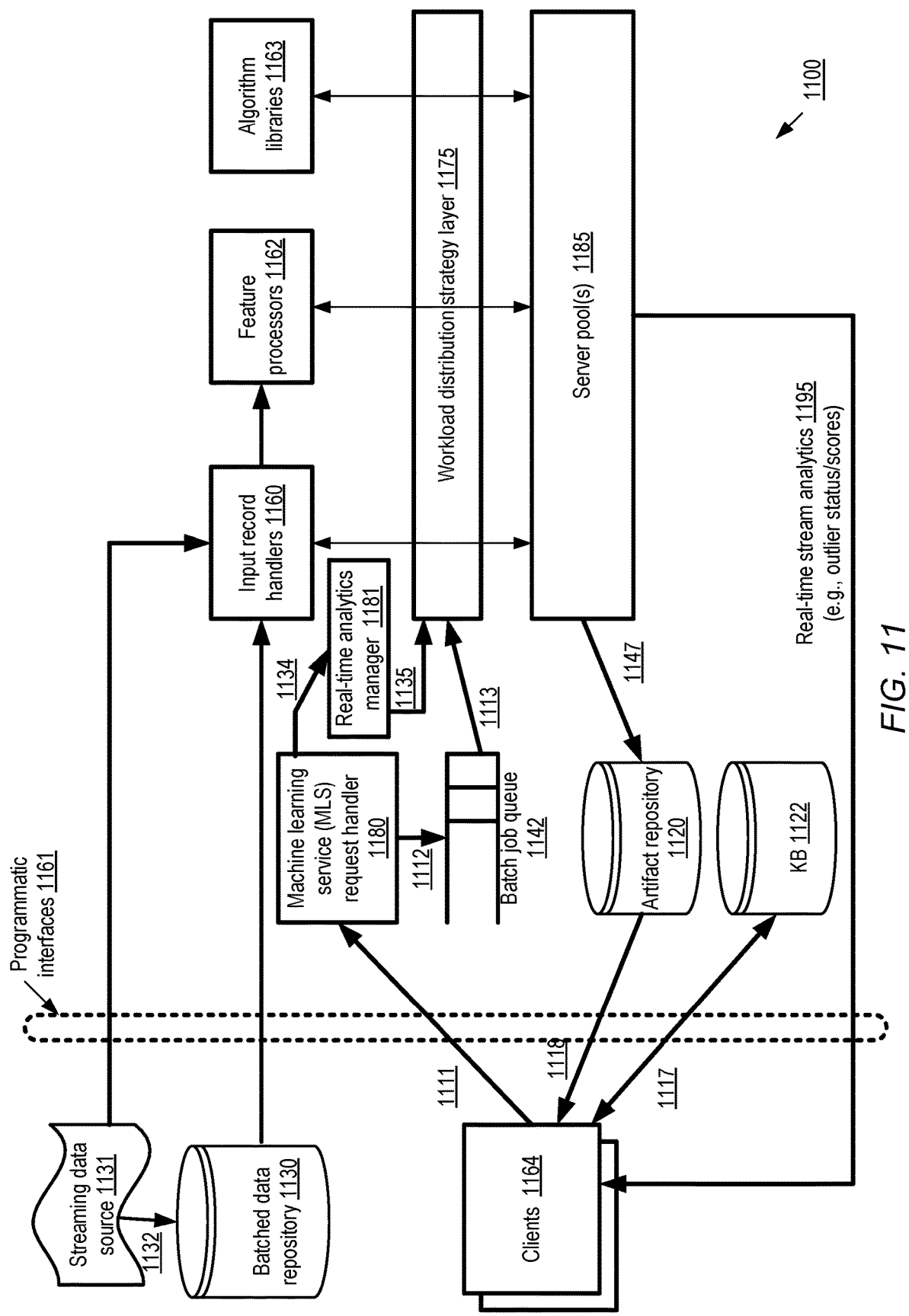
FIG. 11 illustrates a machine learning service at which analysis of streaming data as well as static data sets may be conducted, according to at least some embodiments.

In some embodiments, some or all of the outlier detection algorithms for streaming data described above may be implemented at a machine learning service of a provider network. FIG. 11 illustrates a machine learning service at which analysis of streaming data as well as static data sets may be conducted, according to at least some embodiments. System 1100 includes various components of a scalable machine learning service, including a real-time analytics manager 1181 which may utilize servers from server pools 1185 for computations of the outlier detection algorithms discussed above. The machine learning service may be implemented at a provider network in some embodiments, and the resources used for the machine learning service may be distributed among a number of different data centers.

In the depicted embodiment, input data for various types of analysis may be obtained from at least two types of sources: batched data repositories 1130 and streaming data sources 1131. In addition to the real-time analytics manager 1181, the machine learning service (MLS) may comprise a request handler 1180, a knowledge base 1122 and an artifacts repository 1120 in the depicted embodiment. The knowledge base 1122 may represent a growing collection of entries representing insights gained during earlier instances of the use of outlier detection algorithms (as well as other algorithms) for a variety of data sets, and may be used to guide some of the decisions made by the real-time analytics manager 1181, such as the selection of algorithm parameters for outlier detection. As mentioned earlier, a number of parameter values may have to be selected for a given outlier detection request, such as the number of LSH functions and the number of bands into which they are to be grouped, the number of hash functions to be used for the min-hash signatures of hash buckets, the number and values of the distance thresholds, the thresholds for reportable outlier scores (i.e., the value of N to use when reporting the data records with the top N outlier scores), and so on. The artifacts repository 1120 may be used to store interim and/or final results of outlier detection operations, values of the parameters selected, and so on.

A set of one or more programmatic interfaces 1161 may be implemented at the machine learning service for interactions with clients 1164 in the depicted embodiment. The interfaces may include, for example, one or more web-based consoles or web pages, application programming interfaces (APIs), command-line tools, graphical user interfaces (GUIs) or the like. Using interfaces 1161, clients 1164 may, for example, submit a request to perform outlier detection on the records of a stream whose records can be obtained from a specified streaming data source 1131. The data source may be identified, for example, by providing access information such as a network address, a database address, and/or a storage device address. In some implementations an SQL-based programmatic interface may be included in programmatic interfaces 1161, enabling clients to submit outlier detection requests (and view results corresponding to such requests) using familiar and easy-to-use interfaces.

Generally speaking, the data records of a stream may comprise numerous attributes, including numeric attributes and non-numeric attributes such as categorical attributes, text attributes, Boolean attributes and the like. In some embodiments, outlier detection may be restricted to streams which comprise only numeric attributes—that is, the MLS may reject a request to perform outlier detection if the stream's records contain non-numeric attributes. In other embodiments, the raw data records of a given stream may be pre-processed (e.g., at input record handlers 1160 and/or at feature processors 1162) before the outlier detection algorithm is applied, and such pre-processing may include generating numeric attributes derived from at least some non-numeric attributes using binning or other similar approaches. In such embodiments, outlier detection may be performed on the pre-processed data set rather than on the raw data records of the stream. Other types of pre-processing may also be implemented in various embodiments, such as normalizing attribute values, aggregating groups or subsequences of the data records into combined records, and so on.

In their programmatic interactions with the MLS via interfaces 1161, clients 1164 may indicate a number of preferences or requirements which may be taken into account when performing outlier detection in various embodiments. For example, clients may indicate preferred values of one or more parameters of the outlier detection algorithm (e.g., the b, r, p, q, w parameters for banded LSH, whether min-hash signatures are to be used, etc.), or even select the particular outlier detection algorithm to be used. One client 1164 may wish to view outlier status (e.g., together with attribute values) for all data records for which outlier status is determined, whether the records are classified as outliers or not, while another may only wish to be informed regarding records that are designated as outliers. Some clients 1164 may simply indicate a source of the streaming data and leave the analysis and reporting decisions to the MLS; other clients, who are more conversant with the statistics involved or who are experts in the subject matter or domain for which the stream records are collected, may provide more detailed guidance or preferences with regard to the outlier detection decisions.

The administrative or control plane portion of the MLS may include a request handler 1180, which accepts client requests 1111, determines whether the client request pertains to real-time analysis or batch mode analysis, and takes different actions depending on the nature of the analysis requested. Real-time requests such as outlier detection requests for streaming data may be passed to real-time analytics manager 1181. For batch-mode operations, the request handler may insert corresponding job objects into batch job queue 1142, as indicated by arrow 1112. In general, the control plane of the MLS may comprise a plurality of components (including the request handler, the real-time analytics manager, workload distribution strategy selectors, one or more job schedulers, metrics collectors, and modules that act as interfaces with other services), which may also be referred to collectively as the MLS manager. The data plane of the MLS may include, for example, at least a subset of the servers of pool(s) 1185, storage devices that are used to store input data, intermediate results or final results (some of which may be part of the MLS artifact repository), and the network pathways used for transferring client input data and results.

A given batch job object may indicate one or more operations that are to be performed as a result of the invocation of a programmatic interface 1161, and the scheduling of a given job may in some cases depend upon the successful completion of at least a subset of the operations of an earlier-generated job. In one embodiment, a client may request that outlier detection be performed on the records of a stream in batch mode (e.g., instead of in real time, or in addition to outlier analysis performed in real time). In such a scenario, as indicated by arrow 1132, some or all of the stream data may be stored at a batched data repository. A given stream may be closed to further records in some cases before batch-mode outlier detection is performed; in other cases, batch mode analysis of older saved stream records may be performed concurrently with real-time analysis on newly arriving data. Each batch-mode analysis may be represented by a corresponding job object in the depicted embodiment.

In at least some implementations, job queue 1142 may be managed as a first-in-first-out (FIFO) queue, with the further constraint that the dependency requirements of a given job must have been met in order for that job to be removed from the queue. In some embodiments, jobs created on behalf of several different clients may be placed in a single queue, while in other embodiments multiple queues may be maintained (e.g., one queue in each data center of the provider network being used, or one queue per MLS customer). Asynchronously with respect to the submission of the requests 1111, the next job whose dependency requirements have been met may be removed from job queue 1142 in the depicted embodiment, as indicated by arrow 1113, and a processing plan comprising a workload distribution strategy may be identified for it. The workload distribution strategy layer 1175, which may also be a component of the MLS control plane as mentioned earlier, may determine the manner in which the lower level operations of the job are to be distributed among one or more compute servers (e.g., servers selected from pool 1185), and/or the manner in which the data analyzed or manipulated for the job is to be distributed among one or more storage devices or servers. As indicated by arrow 1135, the workload distribution strategy layer 1175 may also be utilized by real-time analytics manager 1181 in some embodiments, e.g., to help identify the set of servers to be used for the outlier detection algorithm. For example, in at least one embodiment portions of an outlier detection algorithm may be implemented in a parallelized manner (e.g., with hash calculations for different bands and/or respective portions of signature calculations being performed in parallel at respective servers of pool 1185). After the processing plan has been generated and the appropriate set of resources to be utilized for the batch job or the real-time analysis has been identified, operations may be scheduled on the identified resources. Results of some batch jobs or real-time analyses may be stored as MLS artifacts within repository 1120 in some embodiments, as indicated by arrow 1147.

In the embodiment shown in FIG. 11, clients 1164 may be able to view at least a subset of the artifacts stored in repository 1120, e.g., by issuing read requests 1118. Results of real-time stream analytics 1195 (e.g., outlier status or scores for various stream data records) may be made available to clients 1164 from server pools 1185 via interfaces 1161 in some embodiments. Entries may be added to the knowledge base 1117 based on input received from clients in the depicted embodiment, and knowledge base entries may also be viewed by the clients in at least some embodiments, as indicate by arrow 1117. In some embodiments, a relatively straightforward language for feature processing specification may be supported, allowing MLS clients to create "recipes" indicating various feature processing steps that they wish to have applied on data sets. Such recipes may be specified in text format, and then compiled into executable formats that can be re-used with different data sets on different resource sets as needed, e.g., at feature processors 1162. Algorithm libraries 1163 may include a wide variety of machine learning, statistics and data analysis algorithms in addition to outlier detection techniques, such as various types of regression and classification algorithms, neural network algorithms, stochastic gradient descent algorithms, and the like. In at least one embodiment, the MLS may be designed to be extensible—e.g., clients may provide or register their own modules (which may be defined as user-defined functions) for input record handling, feature processing, or for implementing additional machine learning algorithms than are supported natively by the MLS.

It is noted that in some embodiments, the LSH-based outlier detection techniques described above may be applied to a data set which is not necessarily part of a stream—e.g., outliers within any large or small data set may be identified, or outlier scores for various data records of a static data set may be computed using the technique. Furthermore, in various embodiments the techniques need not necessarily be implemented at a machine learning service or at an analytics service—instead, the technique may be implemented at one or more computing devices that are not affiliated with such network-accessible services. In one embodiment, the outlier detection algorithms may be implemented without utilizing provider network or cloud-based resources. In another embodiment, the LSH-based outlier detection algorithms may be implemented as a subcomponent of a larger monitoring tool, such as a tool which continuously collects metrics associated with the operations of an e-commerce web site or a provider network's resource usage levels. In the case of the e-commerce web site, for example, metrics records such as the number of viewers of various products per minute, the number of products added to the catalog per minute, etc. may form the streaming data on which outlier detection is performed. In the case of a provider network's resource usage, the streaming data collected on a continuous basis and analyzed for outliers may include such metrics as the number of storage writes or reads per minute at a particular storage service, the number of network requests per minute from various physical or virtual servers, the CPU utilizations collected over selected intervals at various servers, and so on.

Client-Device Outlier Detection

Figure 12:
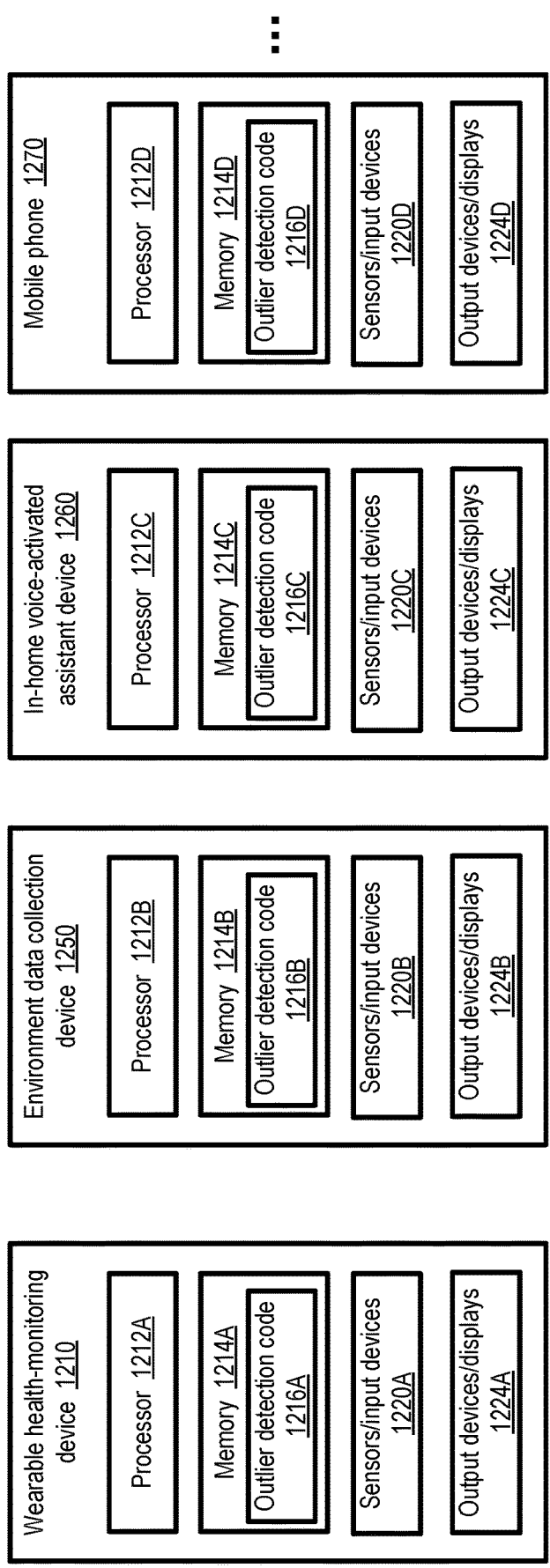
FIG. 12 illustrates example client-side devices at which outlier detection may be performed using locality sensitive hashing algorithms on locally-collected data, according to at least some embodiments.

In some embodiments the outlier detection algorithms described above may be deployed at client-side devices— e.g., at devices that may not have large amounts of computing capacity, memory or storage, may typically be located in the close proximity of customers, and may not be part of the server-side portion of a network-accessible service. FIG. 12 illustrates example client-side devices at which outlier detection may be performed using locality sensitive hashing. Four examples of such client-side devices are shown—a wearable health-monitoring device 1210 (e.g., a fitness tracking device, a device that continuously tracks medical measurements such as blood pressure, heart rate, blood sugar levels and the like), an environmental data collection device 1250 (e.g., a weather monitor, pollution level monitor etc.), an in-home voice-activated assistant device 1260 (e.g., a device that can be used to order items from an online store when supplies run low, or to schedule calendar appointments, etc.), or a mobile phone 1270.

Each of the client-side devices shown in FIG. 12 may comprise one or more processors 1212 (e.g., processors 1212A-1212D), a memory 1214 (e.g., memories 1214A-1214D), some set of sensor modules or input devices 1220 (e.g., 1220A-1220D), and some set of output devices 1224 (e.g., 1224A-1224D) including for example displays or networking devices. Software code 1216 (e.g., 1216A-1216D) for implementing one or more of the LSH-based outlier detection algorithms discussed above may be stored in the memory 1214 of a client-side device. In at least some embodiments, the streaming data records with respect to which LSH-based outlier detection may be performed may be collected locally at the input devices or sensors 1220, and the results obtained locally using code 1216 may be displayed or communicated via the output devices 1224. A wide variety of sensor devices or modules may be employed in different embodiments, including for example temperature sensors, microphones, wind speed sensors, atmospheric pressure sensors, blood pressure sensors, heartbeat monitors, blood sugar level sensors, accelerometers, sensors to detect/ quantify various chemicals (such as carbon monoxide, sulphur dioxide and the like) in the surroundings, and/or gyroscopes. In one embodiment, the outlier detection algorithms may be implemented on data collected at sensors incorporated within transportation vehicles such as cars, trucks, motorcycles, boats, airplanes, space travel vehicles and the like, with the processing of the data being performed at the vehicle itself or at an off-vehicle location. Pollution sensors and/or sensors of agricultural data (such as the levels of moisture, fertilizers, or nutrients present in the soil, or the levels of sugar present in fruit) may also be used as sources of data for which outlier detection may be performed on low-power client-side devices in various embodiments. In some embodiments, instead of or in addition to being analyzed locally, the streaming data records collected at the client-side devices may be transmitted (e.g., via using output devices 1224 such as wireless transmitters) to server-side outlier detectors. In at least one embodiment, instead of or in addition to being displayed locally, the outlier detection results may be transmitted to remote destinations—for example, if an outlier detected locally with respect to health data records indicates a possible medical emergency such as a heart attack or a stroke, information about the outlier may be transmitted to a nearby healthcare provider or ambulance service.

Use Cases

The techniques described above, of utilizing locality sensitive hashing to efficiently detect outliers or anomalies within streaming data sets may be useful in a variety of embodiments. Identifying anomalous or unusual data among fast-arriving records may be critical for fraud detection, intrusion detection, proactive responses to potential failures in hardware systems, appliances or automobiles, and the like. Retailing organizations may be able to isolate drops in order rates and react accordingly using the outlier detection algorithms discussed. A number of health-related applications may also benefit from such techniques, e.g., to identify unusual heart behavior before heart attacks, unusual blood chemistry levels before diseases such as diabetes become severe, and so on. In some cases, the outlier detection algorithm may be implemented as a subcomponent of a larger monitoring facility or tool associated with an e-commerce website and/or a provider network. The outliers detected at such a tool may for example help to generate quick (or even proactive) responses to potentially problematic situations such as resource overloads or non-responsive services. The memory footprints and computation requirements of at least some of the algorithms described herein may be small enough to allow the algorithms to be executed at relatively low-power client-side devices such as environmental sensor devices, wearable health-monitoring devices and the like, enabling quick detection of unusual events for which responses may be required.

Illustrative Computer System

Figure 13:
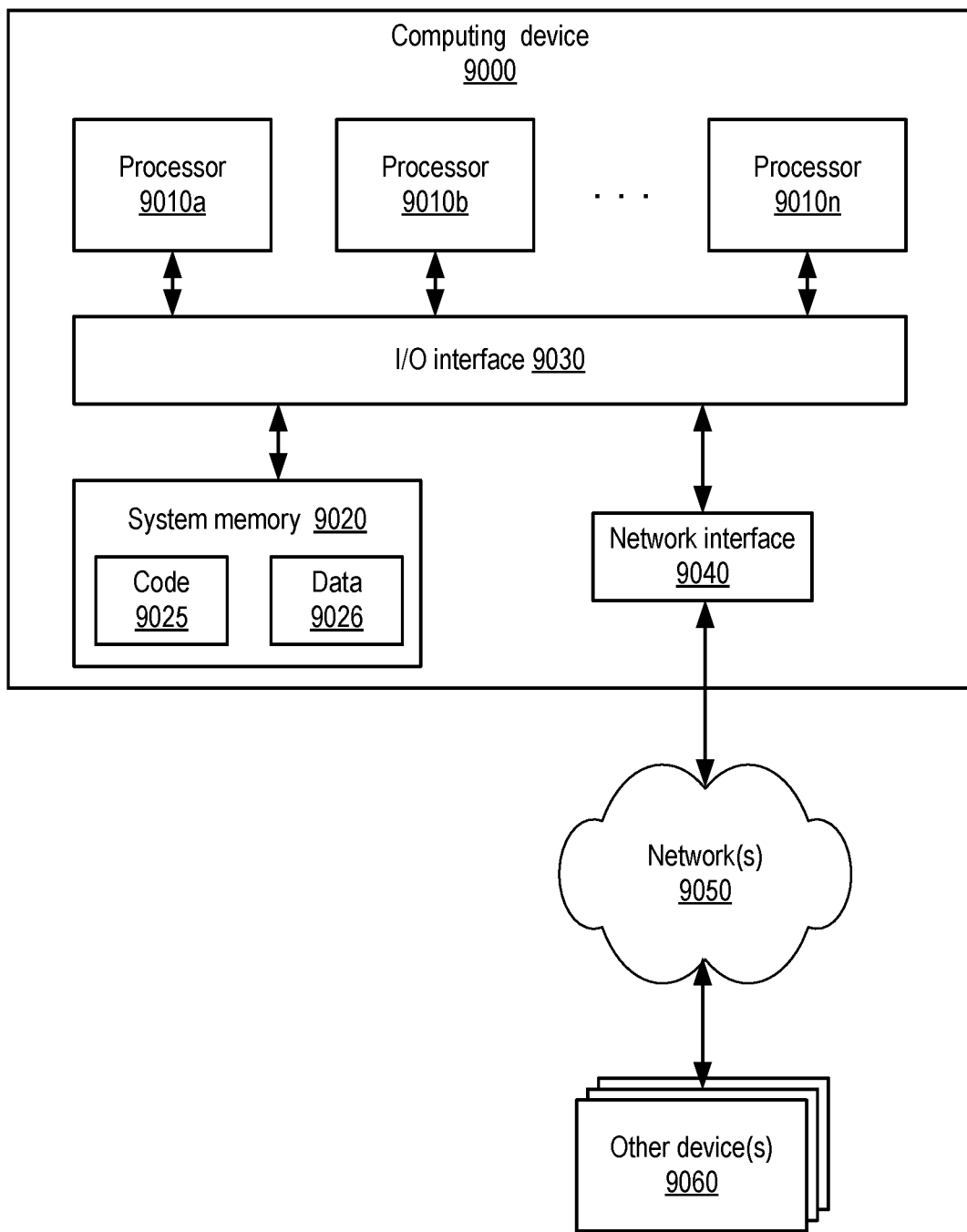
FIG. 13 is a block diagram illustrating an example computing device that may be used in at least some embodiments.

In at least some embodiments, a server that implements a portion or all of one or more of the technologies described herein, including the techniques to implement outlier detection on data streams, various components of a machine learning service or a stream management/analysis service and the like may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a network-accessible analytics service, wherein the one or more computing devices comprise one or more processors and memory;
wherein the one or more computing devices are configured to:
select one or more inter-record distance-based criteria, including a particular inter-record distance-based criterion, to be used to identify outliers among data records of a first data stream, wherein individual ones of the data records comprise respective values of a plurality of input variables;
identify, corresponding to the particular inter-record distance-based criterion, a first set of hash functions, wherein the first set of hash functions comprises a plurality of bands, wherein the plurality of bands includes a first band comprising a first plurality of hash functions of the first set of hash functions;
receive at least a next data record of the first data stream;
determine, based at least in part on an analysis of (a) respective output values produced by the first plurality of hash functions of the first band for the next data record of the first data stream and (b) respective output values previously produced by the first plurality of hash functions of the first band for one or more previous data records of the first data stream, a first matching record set with respect to the next data record and the first band;
obtain, based at least in part on respective matching record sets with respect to the next data record, including the first matching record set, and one or more bands of the plurality of bands, including the first band, an estimate of a count of the one or more previous data records of the first data stream which meet the particular inter-record distance-based criterion with respect to the next data record of the first data stream; and
store a representation of an outlier status of the next data record among the data records of the first data stream, wherein the outlier status is based at least in part on the estimate of the count of the one or more previous data records of the first data stream which meet the particular inter-record distance-based criterion;
add at least some of the respective output values produced by the first plurality of hash functions of the first band for the next data record to the respective output values previously produced by the first plurality of hash functions of the first band for the one or more previous data records of the first data stream.

2. The system as recited in claim 1, wherein the one or more computing devices are configured to:
select a plurality of inter-record distance thresholds to be used to determine respective outlier scores of the data records of the first data stream, including a first inter-record distance threshold associated with the first inter-record distance-based criterion, without receiving an indication of the particular inter-record distance threshold from a client of the stream analytics service.

3. The system as recited in claim 1, wherein the one or more computing devices are configured to:
generate, using a second set of hash functions, a first min-hash signature corresponding to a first set of data records of a second data stream, wherein the first set includes a first data record and a second data record, wherein an output value produced by a particular hash function of the first set of hash functions with respect to the first data record matches an output value produced by the particular hash function with respect to the second data record; and
determine, based at least in part on the first min-hash signature, without storing respective per-data-record entries for the members of the first set of data records of the second data stream, an outlier status of a particular data record of the second data stream.

4. The system as recited in claim 3, wherein to determine the outlier status of the particular data record of the second data stream, the one or more computing devices are configured to:
determine a number of matching elements of the first min-hash signature and a second min-hash signature, wherein the second min-hash signature corresponds to a second set of data records of the second data stream;
generate, based at least in part on the number of matching elements, a first approximate min-hash signature corresponding to an intersection of the first set of data records of the second data stream and the second set of data records of the second data stream.

5. The system as recited in claim 4, wherein the plurality of bands of the first set of hash functions includes a second band, wherein first approximate min-hash signature corresponds to output values produced using the first band, wherein to determine the outlier status of the particular data record of the second data stream, the one or more computing devices are configured to:
- determine a number of matching elements of the first approximate min-hash signature and a second approximate min-hash signature, wherein the second approximate min-hash signature corresponds to output values produced using the second band;
- generate, based at least in part on the number of matching elements of the first approximate min-hash signature and the second approximate min-hash signature, a third approximate min-hash signature; and
- utilize the third approximate min-hash signature to estimate a count of data records of the second data stream which meet another inter-record distance-based criterion with respect to the particular data record of the second data stream.

6. A method, comprising:
performing, by one or more computing devices:
- identifying, corresponding to a particular inter-record distance-based criterion associated with outlier detection of data records of a first data stream, a first set of hash functions, wherein the first set of hash functions comprises a plurality of bands, wherein the plurality of bands includes a first band comprising a first plurality of hash functions of the first set of hash functions;
- receive at least a next data record of the first data stream;
- determining, based at least in part on an analysis of (a) respective output values produced by the first plurality of hash functions of the first band for the next data record of the first data stream and (b) respective output values previously produced by the first plurality of hash functions of the first band for one or more previous data records of the first data stream, a matching record set with respect to the next data record and the first band;
- obtaining, based at least in part on respective matching record sets with respect to the next data record, including the matching record set, and one or more bands including the first band, an estimate of a count of the one or more previous data records of the first data stream which meet the particular inter-record distance-based criterion with respect to the next data record of the first data stream; and
- storing a representation of an outlier status of the next data record among the data records of the first data stream, wherein the outlier status is based at least in part on the estimate of the count of the one or more previous data records of the first data stream which meet the particular inter-record distance-based criterion;
- add at least some of the respective output values produced by the first plurality of hash functions of the first band for the next data record to the respective output values previously produced by the first plurality of hash functions of the first band for the one or more previous data records of the first data stream.

7. The method as recited in claim 6, further comprising performing, by the one or more computing devices:
- generating, using a second set of hash functions, a first min-hash signature corresponding to a first set of data records of a second data stream, wherein the first set of data records includes a first data record and a second data record, wherein an output value produced by a particular hash function of the first set of hash functions with respect to the first data record matches an output value produced by the particular hash function with respect to the second data record; and
- determining, based at least in part on the first min-hash signature, an outlier status of a particular data record of the second data stream.

8. The method as recited in claim 7, wherein said determining the outlier status of the particular data record of the second data stream comprises:
- determining a number of matching elements of the first min-hash signature and a second min-hash signature, wherein the second min-hash signature corresponds to a second set of data records of the second data stream;
- generating, based at least in part on the number of matching elements, a first approximate min-hash signature corresponding to an intersection of the first set of data records of the second data stream and the second set of data records of the second data stream.

9. The method as recited in claim 8, wherein the first approximate min-hash signature comprises a plurality of elements including a first element associated with a first hash function of the second set of hash functions, further comprising performing, by the one or more computing devices:
- storing an invalidity token associated with the first element of the first approximate min-hash signature, wherein the invalidity token indicates that a corresponding element of the first min-hash signature differs from a corresponding element of the second min-hash signature; and
- determining the outlier status of the particular data record of the second data stream based at least in part on determining that the first approximate min-hash signature includes the invalidity token.

10. The method as recited in claim 8, wherein the plurality of bands of the first set of hash functions includes a second band, wherein first approximate min-hash signature corresponds to output values produced using the first band, wherein said determining the outlier status of the particular data record of the second data stream comprises:
- determining a number of matching elements of the first approximate min-hash signature and a second approximate min-hash signature, wherein the second approximate min-hash signature corresponds to output values produced using the second band;
- generating, based at least in part on the number of matching elements of the first approximate min-hash signature and the second approximate min-hash signature, a third approximate min-hash signature; and
- utilizing the third approximate min-hash signature to estimate a count of data records of the second data stream which meet another inter-record distance-based criterion with respect to the particular data record of the second data stream.

11. The method as recited in claim 6, further comprising performing, by the one or more computing devices:
- receiving, via a programmatic interface from a client, an indication of the particular inter-record distance-based criterion.

12. The method as recited in claim 6, further comprising performing, by the one or more computing devices:
- receiving, via a programmatic interface from a client, an indication of a number of data records to be included in a set of outliers of the first data stream, wherein an inclusion of a data record in the set of outliers is to be based at least in part on a ranking of outlier scores assigned to the data records; and selecting a plurality of inter-record distance thresholds to be used to determine outlier scores of the data records, including a first inter-record distance threshold associated with the particular inter-record distance-based criterion, without receiving an indication of the particular inter-record distance threshold from the client.

13. The method as recited in claim 6, further comprising performing, by the one or more computing devices:

determining the number of bands into which the first set of hash functions is subdivided based at least in part on one or more of: (a) the first inter-record distance-based criterion, (b) a measure of available resources for outlier detection, or (c) a client request received via a programmatic interface.

14. The method as recited in claim 6, further comprising performing, by the one or more computing devices:

determining the number of hash functions to be included in the first band based at least in part on one or more of: (a) the first inter-record distance-based criterion, (b) a measure of available resources for outlier detection, or (c) a client request received via a programmatic interface.

15. The method as recited in claim 6, wherein a particular data record of a second data stream comprises a plurality of input variables, wherein a particular computing device of the one or more computing devices comprises one or more sensor modules, further comprising performing, by the particular computing device:

determining, using the one or more sensor modules, a value of a particular input variable of the plurality of input variables;

generating an output value corresponding to a particular hash function of the first set of hash functions and the particular data record of a second data stream; and determining an outlier status of the particular data record of a second data stream based at least in part on the output value.

16. A non-transitory computer-accessible storage medium storing program instructions that when executed on one or more processors:

determine, based at least in part on an analysis of (a) respective output values produced by one or more hash functions of a first band of hash functions for a received next data record of a first data stream and (b) respective output values previously produced by the one or more hash functions for one or more previous data records of the first data stream, a matching record set with respect to the next data record and the first band;

obtaining, based at least in part on respective matching record sets with respect to the next data record, including the matching record set, and one or more bands of hash functions including the first band, an estimate of a count of the one or more previous data records of the first data stream which meet a particular inter-record distance-based criterion with respect to the next data record of the first data stream; and storing a representation of an outlier status of the next data record among the data records of the first data stream, wherein the outlier status is based at least in part on the estimate of the count of the one or more previous data records of the first data stream which meet the particular inter-record distance-based criterion;

add at least some of the respective output values produced by the one or more hash functions of the first band of hash functions for the received next data record to the respective output values previously produced by the one or more hash functions for the one or more previous data records of the first data stream.

17. The non-transitory computer-accessible storage medium as recited in claim 16, wherein the instructions when executed on one or more processors:

select a plurality of inter-record distance thresholds to be used to determine respective outlier scores of the data records of the first data stream, including a first inter-record distance threshold associated with the first inter-record distance-based criterion, without receiving an indication of the particular inter-record distance threshold from a client.

18. The non-transitory computer-accessible storage medium as recited in claim 16, wherein the instructions when executed on one or more processors:

generate, using a selected set of signature-generation hash functions, a first min-hash signature corresponding to a first set of data records of a second data stream, wherein the first set includes a first data record and a second data record, wherein an output value produced by a particular hash function of the first band of hash functions with respect to the first data record matches an output value produced by the particular hash function with respect to the second data record; and determine, based at least in part on the first min-hash signature, without storing respective per-data-record entries for the members of the first set of data records of the second data stream, an outlier status of a particular data record of the second data stream.

19. The non-transitory computer-accessible storage medium as recited in claim 18, wherein to determine the outlier status of the particular data record of the second data stream, the instructions when executed on one or more processors:

determine a number of matching elements of the first min-hash signature and a second min-hash signature, wherein the second min-hash signature corresponds to a second set of data records of the second data stream;

generate, based at least in part on the number of matching elements, a first approximate min-hash signature corresponding to an intersection of the first set of data records of the second data stream and the second set of data records of the second data stream.

20. The non-transitory computer-accessible storage medium as recited in claim 18, wherein first approximate min-hash signature corresponds to output values produced using the first band, wherein to determine the outlier status of the particular data record of the second data stream, the instructions when executed on one or more processors:

determine a number of matching elements of the first approximate min-hash signature and a second approximate min-hash signature, wherein the second approximate min-hash signature corresponds to output values produced using a second band of hash functions;

generate, based at least in part on the number of matching elements of the first approximate min-hash signature and the second approximate min-hash signature, a third approximate min-hash signature; and utilize the third approximate min-hash signature to estimate a count of data records of the second data stream which meet another inter-record distance-based criterion with respect to the particular data record of the second data stream.

21. The non-transitory computer-accessible storage medium as recited in claim 16, wherein the particular inter-record distance-based criterion corresponds to a particular distance threshold expressed as one or more of: (a) a Euclidean distance, (b) a cosine-similarity based distance, or (c) a Jaccard's distance.

22. A system, comprising:
- a processor;
- a memory;
- one or more sensor devices; and
- an output device;
- wherein the memory comprises program instructions that, when, executed on the processor:
  - cause a next data record of a data stream to be collected via the one or more sensor devices, wherein a plurality of previous data records of the data stream have been previously collected via the one or more sensor devices, and wherein the next data record of the data stream comprises respective values of one or more input variables;
  - determine, based at least in part on an analysis of (a) respective output values produced by a first plurality of hash functions for the next data record of the data stream, and (b) respective output values previously produced by the first plurality of hash functions for one or more of the previous data records of the data stream, an estimate of a count of the previous data records of the data stream which meet a particular inter-record distance-based criterion with respect to the next data record of the first data stream; and
  - generate, using the output device, a representation of an outlier status of the next data record among the previous data records of the data stream, wherein the outlier status is based at least in part on the estimate of the count of the previous data records of the data stream which meet the particular inter-record distance-based criterion with respect to the next data record;
  - add at least some of the respective output values produced by the first plurality of hash functions for the next data record of the data stream to the respective output values previously produced by the first plurality of hash functions for the one or more of the previous data records of the data stream.

23. The system as recited in claim 22, wherein the one or more sensor devices include one or more of: a temperature sensor, a microphone, a wind speed sensor, an atmospheric pressure sensor, a blood pressure sensor, a heartbeat monitor, a blood sugar level sensor, an accelerometer, a gyroscope, a sensor to detect or quantify the presence of one or more chemicals, an agricultural sensor, a pollution level sensor, or a sensor incorporated within a transportation vehicle.

* * * * *